US009365449B2

(12) United States Patent
Ueda

(10) Patent No.: US 9,365,449 B2
(45) Date of Patent: Jun. 14, 2016

(54) SELECTIVE LIGHT TRANSMITTING WINDOW GLAZINGS AND METHODS OF DESIGN AND MANUFACTURE

(75) Inventor: Masahiro Ueda, Kyoto (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 1097 days.

(21) Appl. No.: 13/421,947

(22) Filed: Mar. 16, 2012

(65) Prior Publication Data

US 2012/0229907 A1   Sep. 13, 2012

Related U.S. Application Data

(63) Continuation-in-part of application No. PCT/US2011/027733, filed on Mar. 9, 2011.

(51) Int. Cl.
| | |
|---|---|
| G02B 27/00 | (2006.01) |
| C03C 17/00 | (2006.01) |
| G02B 5/02 | (2006.01) |
| B60J 1/00 | (2006.01) |

(52) U.S. Cl.
CPC ............... *C03C 17/00* (2013.01); *B60J 1/008* (2013.01); *G02B 5/0278* (2013.01); *C03C 2217/70* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,020,827 A | * | 5/1977 | Broberg | F24J 2/045 126/623 |
| 4,035,539 A | * | 7/1977 | Luboshez | B32B 3/28 359/580 |
| 4,074,704 A | * | 2/1978 | Gellert | F24J 2/062 126/683 |
| 4,130,351 A | * | 12/1978 | Luboshez | F24J 2/407 359/596 |
| 4,143,492 A | | 3/1979 | Dunn | |
| 4,222,807 A | * | 9/1980 | Farber | F24J 2/0488 156/244.13 |
| 4,257,403 A | | 3/1981 | Chevalier | |
| 4,357,074 A | | 11/1982 | Nardini | |
| 4,411,493 A | | 10/1983 | Miller | |
| 4,498,455 A | | 2/1985 | Gramm | |
| 4,519,675 A | * | 5/1985 | Bar-Yonah | F21V 5/02 359/595 |

(Continued)

OTHER PUBLICATIONS

International Search Report and Written Opinion dated Apr. 18, 2011 as received in application No. PCT/US2011/027733.

(Continued)

*Primary Examiner* — Bumsuk Won
*Assistant Examiner* — Balram Parbadia
(74) *Attorney, Agent, or Firm* — Maschoff Brennan

(57) ABSTRACT

Technologies are generally described for designing a window glazing for a particular geographical location. In some examples, a window glazing can be designed to selectively block sunlight from entering the window during summer when it may be desirable to have inside temperatures substantially lower than outside temperatures. The glazing can also be designed to selectively allow sunlight to enter the window during winter months when heat from sunlight may be desirable to raise indoor temperatures. The glazing can be prepared from a transparent material that can allow substantially full transmission of sunlight.

18 Claims, 7 Drawing Sheets

(56) References Cited

U.S. PATENT DOCUMENTS

| | | | | |
|---|---|---|---|---|
| 4,890,900 | A | * | 1/1990 | Walsh ............... A01G 9/243 359/596 |
| 5,071,206 | A | | 12/1991 | Hood et al. |
| 5,220,462 | A | * | 6/1993 | Feldman, Jr. ........... F24J 2/085 126/684 |
| 5,461,496 | A | * | 10/1995 | Kanada ............... E06B 9/24 359/592 |
| 5,511,537 | A | * | 4/1996 | Hively ............... F24J 2/0444 126/600 |
| 5,828,494 | A | * | 10/1998 | Stremple ............. G02B 5/045 359/591 |
| 5,952,081 | A | | 9/1999 | Lorenz |
| 6,094,306 | A | | 7/2000 | Jain |
| 6,311,437 | B1 | * | 11/2001 | Lorenz ................ 52/173.3 |
| 8,303,122 | B2 | * | 11/2012 | Hughes ............. E06B 3/6715 359/601 |
| 2002/0008915 | A1 | * | 1/2002 | Koster ............... E06B 9/386 359/601 |
| 2004/0131793 | A1 | * | 7/2004 | Bier et al. ............. 427/535 |
| 2005/0068630 | A1 | | 3/2005 | Nitz et al. |
| 2008/0216399 | A1 | | 9/2008 | Kiyohara et al. |
| 2010/0051093 | A1 | | 3/2010 | Harder et al. |

OTHER PUBLICATIONS

Smith et al., "Angular Selective Thin Film Glazing", Department of Applied Physics, University of Technology, Sydney, Renewable Energy 15 (1998) 183-188.

Heim et al., "Shading Devices Designed to Achieve the Desired Quality of Internal Daylight Environment", 23rd Conference on Passive and Low Energy Architecture, Switzerland, 2006.

* cited by examiner

SELECTIVE LIGHT TRANSMITTING WINDOW GLAZINGS AND METHODS OF DESIGN AND MANUFACTURE

CROSS-REFERENCE TO RELATED APPLICATION

This application is a Continuation-in-part under 35 U.S.C. §120 of U.S. Application No. PCT/US2011/027733, filed on Mar. 9, 2011.

BACKGROUND

Generally, a window is a device located in an opening in a wall or door that allows the passage of light. Windows are usually glazed or covered in some other transparent or translucent material like a float glass. Windows are held in place by frames, which prevent them from collapsing in. Many glazed windows may be opened, to allow ventilation, or closed, to exclude inclement weather.

Many windows include glazings and/or fillings. Common types of glazing that are used in architectural applications include clear and tinted float glass, tempered glass, and laminated glass as well as a variety of coated glasses, all of which can be glazed singly or as double, or even triple, glazing units. Ordinary clear glass has a slight green tinge but special clear glasses are offered by several manufacturers.

Since windows allow light to pass therethrough, a significant amount of heat may be accumulated inside of a structure having the window, especially when the window is oriented to receive incident sunlight. As such, various glazings and coatings have been designed to decrease the amount of sunlight that is transmitted through the window. Low-emissivity coatings can reduce heat transfer by sunlight radiation, which, depending on which surface is coated helps prevent heat loss (in cold climates) or heat gain (in warm climates). High thermal resistance can be obtained by evacuating or filling insulated glazing units with gases such as argon or krypton, which reduces conductive heat transfer due to their low thermal conductivity. The thermal performance of windows that have glazings depends on good window seals and meticulous frame construction to prevent entry of hot or cold air and loss of efficiency. Modern double-pane and triple-pane windows often include one or more low-e coatings to reduce the window's U-factor. In general, soft-coat low-emissivity coatings tend to result in a lower solar heat gain coefficient (SHGC) than hard-coat low-coatings.

Additionally, the angle at which light from the sun strikes a window can be determinative of the amount of heat that can accumulate within a structure. Historically, windows are usually designed with surfaces parallel to vertical building walls. Such a design allows considerable sunlight and heat penetration due to the most commonly occurring incidence of sun angles when the window is oriented so as to receive sunlight. In passive solar building design, an extended eave over a window is typically used to control the amount of sunlight and heat entering the window(s). An alternate method would be to calculate a more optimum angle for mounting windows which accounts for summer sunlight load minimization, with consideration of the actual latitude of the particular building. An example where this process has been implemented is the Dakin Building, Brisbane, Calif.; much of the fenestration has been designed to reflect summer sunlight heat load and assist in preventing summer interior over-illumination and glare, by designing window canting to achieve a near 45 degree angle with respect to the ground.

While there have been various advances in the art of windows and glazings to inhibit sunlight from passing therethrough, none of the advances have found a solution that also allows significant sunlight transmittance during colder winter months.

SUMMARY

In one embodiment, a method of designing a light absorbing, transparent window glazing can include: determining a geographical area for the window glazing; obtaining an eigenvalue $\alpha$ for noon during summer solstice for the geographical location; obtaining an eigenvalue $\beta$ for noon during winter solstice for the geographical location; inputting the eigenvalues $\alpha$ and $\beta$ into a computing system; and computing, with the computing system, a design of one or more ridges for the window glazing, each of the one or more ridges including a light absorbing surface that protrudes away from a base to a tip formed with a light transmitting surface sloped from the tip toward the base.

In one embodiment, a method of manufacturing a window glazing can include: determining a geographical area for the window glazing; obtaining an eigenvalue $\alpha$ for noon during summer solstice for the geographical location; obtaining an eigenvalue $\beta$ for noon during winter solstice for the geographical location; inputting the eigenvalues $\alpha$ and $\beta$ into a computing system; computing, with the computing system, a design of one or more ridges for the window glazing, each of the one or more ridges including a light absorbing surface that protrudes away from a base to a tip formed with a light transmitting surface sloped from the tip toward the base; and manufacturing a window glazing in accordance with the design.

In one embodiment, a transparent window glazing can include: a substantially flat base surface; one or more light absorbing surfaces opposite of the base surface and having a relative angle with the base surface of about 90 degrees to about 45 degrees; one or more light transmitting surfaces opposite of the base surface and alternating with the one or more light absorbing surfaces so that each light transmitting surface is located adjacent to one or more light absorbing surfaces and so that each light absorbing surface and light transmitting surface pair form a ridge protruding from the base surface, and having a relative angle with the base surface of about 1 degree to about 89 degrees; and a light absorbing coating covering each of the one or more light absorbing surfaces. The one or more light absorbing surfaces and one or more light transmitting surfaces can be configured to have a minimum light transmission when located on a vertical window facing between east to south to west at noon of summer solstice at a geographical location and directional orientation at or north of the equator or facing between east to north to west at noon of summer solstice at a geographical location and directional orientation at or south of the equator.

In one embodiment, a method of manufacturing a transparent window glazing can include: obtaining a design of a light absorbing, transparent window glazing. The design can include: orientation angles of one or more light absorbing surfaces relative to an opposite base surface and having a relative angle with the base surface of about 90 degrees to about 45 degrees; dimensions of the one or more light absorbing surfaces; orientation angles of one or more light transmitting surfaces relative to the one or more light absorbing surfaces and to the opposite base surface and having a relative angle with the base surface of about 1 degrees to about 89 degrees; and dimensions of the one or more light transmitting surfaces. The one or more light absorbing surfaces and one or more light transmitting surfaces are configured to have a minimum light transmission when located on a vertical window facing between east to south to west at noon of summer solstice at a geographical location and directional orientation at or north of the equator or facing between east to north to west at noon of summer solstice at a geographical location and directional orientation at or south of the equator. The transparent window glazing can be manufactured in accordance with the design.

In one embodiment, a method of manufacturing a transparent window glazing can include; obtaining a design of a window glazing having one or more light absorbing surfaces and one or more light transmitting surfaces that are configured to have a minimum light transmission when located on a vertical window facing between east to south to west at noon of summer solstice at a geographical location and directional orientation at or north of the equator or facing between east to north to west at noon of summer solstice at a geographical location and directional orientation at or south of the equator and configured to have a maximum light transmission when located on a vertical window facing between east to south to west at noon of winter solstice at a geographical location and directional orientation at or north of the equator or facing between east to north to west at noon of winter solstice at a geographical location and directional orientation at or south of the equator; mixing a tetraalkoxysilane, an alcohol, water, and an acid to prepare a sol dispersion; applying the sol dispersion to a substrate; drying the sol dispersion on the substrate; applying black lines on the dried sol dispersion that correspond with the light absorbing surfaces; pressing a mold into dried sol dispersion in order to form shape of the window glazing to have the light absorbing surfaces with the black lines and the light transmitting surfaces without the black lines; and calcinating the shaped, dried sol dispersion to form the window glazing.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1A:
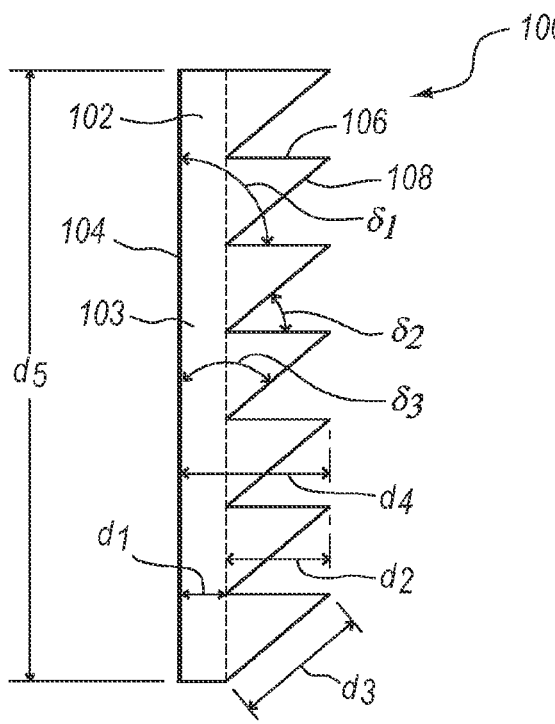
FIGS. 1A-1C show schematic diagrams of an example of a window glazing having selective sunlight absorbance and transmittance.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the technology described herein includes a light absorbing, transparent window glazing that is embossed, impressed, molded, shaped, or otherwise prepared to have a pattern that appears as a series of wedge shaped ridges that are linked together so as to form a ridgeline extending from a top of the glazing to a bottom of the glazing. The technology also includes methods of designing such a window glazing and methods of manufacturing the window glazing. Each ridge of the glazing includes at least one surface that functions as a means for absorbing sunlight and at least one surface that functions as a means for transmitting sunlight. Each ridge is adjacent to one or two other ridges, and each ridge intersects another at a trough of the ridgeline. The window glazing can be designed to have optimal light absorbing properties at noon of the summer solstice and optimal light transmitting properties at noon of the winter solstice for a particular geographical location. The window glazing may also be designed to have these properties when facing a particular direction with respect to the poles of the earth. The poles of the earth referred to herein are the geographical poles, not magnetic poles.

The method of designing the window glazing can be performed such that the window is configured for being used at a particular geographical location on the earth. The designing method can also be performed such that the window is configured to be facing a certain direction with respect to the poles of the earth for the particular geographical location. Accordingly, information about the sun and its relative position with respect to a particular geographical location on the earth can be used in designing the window glazing. Such information can be obtained for certain annual time points, such as summer solstice, winter solstice, autumn equinox, spring equinox, other annual time points, or periods therebetween. Also, the information can include the relationship of the sun with respect to the earth at time points throughout a day (e.g., daily time point), such as sunrise, noon, and sunset, which can be correlated with the annual time points or periods.

The information can be processed through one or more equations in order to identify the values of variables for the window glazing, where such processing can be performed by hand with a writing device or with a computing system. The processing of the information with the equation(s) in designing the window glazing can be too complicated for a mere mental process such that some device is used for determining values of the window glazing.

In one embodiment, a window glazing can be configured to selectively block sunlight from entering the window during summer when it may be desirable to have inside temperatures substantially lower than outside temperatures. The glazing can also be configured to selectively allow sunlight to enter the window during winter months when heat from sunlight may be desirable to raise indoor temperatures. The glazing can be prepared from a transparent material that can allow substantially full transmission of sunlight.

A transparent window glazing can include a transparent glazing body having a base surface (e.g., substantially flat base surface), one or more sunlight absorbing surfaces and one or more sunlight transmitting surfaces. The one or more sunlight absorbing surfaces can be positioned opposite of the base surface and can have a relative angle with the base surface of about 90 degrees to about 45 degrees. The one or more sunlight transmitting surfaces can be positioned opposite of the base surface. The one or more sunlight transmitting surfaces can be positioned so as to be alternating with the one or more sunlight absorbing surfaces. A sunlight transmitting surface can be located adjacent to one or more sunlight absorbing surfaces so that a sunlight absorbing surface and sunlight transmitting surface pair form a ridge protruding away from the base surface. The sunlight transmitting surfaces can have a relative angle with the base surface of about 1 degree to about 89 degrees. A sunlight absorbing coating can be applied to each of the sunlight absorbing surfaces.

In one embodiment, a window can be fabricated or modified to include a glazing that selectively blocks or allows sunlight to pass therethrough. The window can include any transparent window with the transparent window glazing attached to the transparent window.

In one embodiment, a structure can include a window having the glazing as described herein. Generally, the structure can be geographically stationary like a building, and can include a window and glazing. However, the structure can be movable in some instances, such as when the window is included in a recreational vehicle.

In one embodiment, a method of designing a sunlight absorbing, transparent window glazing can be performed for a pre-determined geographical location. The geographical location can be a particular coordinate of latitude and longitude, or an area that ranges between particular coordinates, such as between certain latitudes and certain longitudes. The sunlight absorbing, transparent window glazing can also be designed to face a certain direction with respect to the poles of the earth, which can include designing the glazing for locations north, at, or south of the equator. The designing can be performed by using the geographical location in order to identify parameters that can be used to calculate the values of the dimensions of the glazing as well as the orientation of angles of the pattern of the glazing. Such calculations can be performed with one or more equations provided herein or well-known to one of ordinary skill in the art. When calculations are performed, a computing system can be used in order to facilitate accuracy in the design that is determined from the equations.

A method of designing a glazing in accordance with the parameters provided herein can include the following: determining orientation angles of one or more sunlight absorbing surfaces relative to an opposite base surface and having a relative angle with the base surface of about 90 degrees to about 45 degrees; determining dimensions of the one or more sunlight absorbing surfaces; determining orientation angles of one or more sunlight transmitting surfaces relative to the one or more sunlight absorbing surfaces and to the opposite base surface and having a relative angle with the base surface of about 1 degrees to about 89 degrees; determining dimensions of the one or more sunlight transmitting surfaces; and determining sunlight absorbing coating characteristics for application to the sunlight absorbing surfaces. This method can be performed as a computing method where the determinations are obtained with the use of a computing system. Also, a computer program product can be used that has computer executable instructions for performing the designing method. Accordingly, the various method steps recited herein can be performed with a computing system using a computer program product, if possible.

Another method of designing a sunlight absorbing, transparent window glazing, which can be a computing method, can include: determining orientation angles of one or more sunlight transmitting surfaces relative to an opposite base surface and having a relative angle with the base surface of about 1 degrees to about 89 degrees; determining dimensions of the one or more sunlight transmitting surfaces; determining orientation angles of one or more sunlight absorbing surfaces relative to the one or more sunlight transmitting surfaces and to the opposite base surface and having a relative angle with the base surface of about 90 degrees to about 45 degrees; determining dimensions of the one or more sunlight absorbing surfaces; and determining sunlight absorbing coating characteristics for application to the sunlight absorbing surfaces.

In one embodiment, a method of manufacturing a transparent window glazing can include: designing or obtaining a design of the sunlight absorbing, transparent window glazing as described herein and manufacturing the transparent window glazing. The window glazing can then be applied to a window. The manufacturing process can vary depending on the materials that are used.

The technology includes methods of designing a window glazing to include a ridgeline having ridges that are designed to have selective sunlight absorbance and transmittance at a particular geographical location. For example, the cross-sectional profile of the ridges may be different for a window glazing to be used in Tokyo compared to a window glazing to be used in Salt Lake City. In part, this is because the summer solstice and winter solstice events in these two different geographical locations have different relative incident angles of sunlight with respect to vertical windows. The particular relative incident angles of sunlight at the summer and winter solstice events are used to calculate the cross-sectional profile of the ridges and orientation with respect to the incident sunlight. The calculated cross-section profile of a ridge can have a triangular shape, often with a right angle in the plane of the window glazing. The calculations can provide the angles of the triangular ridge shape and corresponding dimensions of light absorbing and transmitting surfaces.

Additionally, technology includes methods of manufacturing a window glazing that functions to selectively inhibit summer sunlight transmittance, but allow maximum winter sunlight transmittance. The methods of manufacture can also include established and later developed methods that can prepare a glazing having the functionality as described herein.

Generally, the term "lite" refers to a window pane, several of which may be used to construct the final window product. For example, a sash unit, having at least one sliding window component, is typically composed of two lites, while a fixed window is composed of one lite. The terms "single-lite", "double-lite" etc. refer to the number of these window panes in a window. Often, the lites in a window sash are divided horizontally and vertically by narrow strips of wood or metal called muntins. More substantial load bearing or structural vertical dividers are called mullions, with the corresponding horizontal dividers referred to as transoms.

In the United States (U.S.), the term "replacement window" means a framed window designed to slip inside the original window frame from the inside after the old sashes are removed. In Europe, however, it usually means a complete window including a replacement outer frame.

In the U.S., the term "new construction window" means a window with a nailing fin designed to be inserted into a rough opening from the outside before applying siding and inside trim. A nailing fin is a projection on the outer frame of the window in the same plane as the window pane, which overlaps the prepared opening, and can thus be 'nailed' into place. In the UK and mainland Europe, windows in new-build houses are usually fixed with long screws into expanding plastic plugs in the brickwork. A gap of up to 13 mm is left around all four sides, and filled with expanding polyurethane foam. This makes the window fixing weatherproof but allows for expansion due to heat.

A beam over the top of a window is known as the lintel or transom, while a beam below the bottom of a window is known as the sill plate or window sill.

In the U.S., the following terms are often used to describe the property of windows and glazings: thermal transmittance (e.g., U-factor), and exemplary values are around U-0.15 (e.g., equal to 0.8 W/m$^2$/K); solar heat gain coefficient (SHGC) is the ratio of solar heat (e.g., infrared) passing through the glass to incident solar heat; visible transmittance (VT) is the ratio of transmitted visible sunlight divided by incident visible sunlight; air leakage (AL) is measured in cubic foot per minute per linear foot of crack between sash and frame; and condensation resistance (CR) is measured between 1 and 100 where the higher the number, the higher the resistance of the formation of condensation. The disclosure provided herein is concerned with thermal transmittance, SHGC, and VT. However, AL and CR may also be parameters that can be modulated through various windows and glazings described herein.

As used herein, the term "optical modification" refers to some physical modification of the shape of a window or glazing body that changes the properties of sunlight that passes therethrough. For example, changing the shape of a surface from flat to curved can change the optical properties, and thereby imparting an optical modification to a window or glazing body can change the properties of sunlight passing therethrough.

Generally, a transparent window glazing can be designed for use as a standalone glazing that operates as a fully functional window or can be configured to be coupled to a window base. The glazing can include a transparent body that, without optical modification, allows sunlight to pass through unhindered; however, some or significant sunlight absorption as well as colorization and color transmission may be allowable. The transparent body undergoes optical modification in order to selectively inhibit sunlight transmission during periods when outside temperatures are high, and also selectively allows uninhibited or minimally inhibited sunlight transmission during cooler periods.

The transparent glazing body may be designed for a particular material or designed to be capable of being made from any material that is traditionally used for windows and glazings. In one aspect, the glazing can include glass that is clear as well as tinted and colored glass. The glass can be typical silica glass that may or may not include dopants that modulate the optical properties of the glass.

Some examples of dopants can include: sodium carbonate for lowering the glass transition temperature from over 2300° C. to about 1500° C.; calcium oxide (i.e., lime) for increasing chemical and physical durability; magnesium oxide for increasing chemical and physical durability; aluminum oxide for increasing chemical and physical durability; lead for increasing the "brilliance" of the glass by increasing the refractive index, specular reflection, and/or optical dispersion; barium for increasing the refractive index; thorium oxide for higher refractive index and low dispersion; lanthanum oxide for higher refractive index and low dispersion; cerium(IV) oxide for absorbing ultra-violet (UV) light; boron oxide for preparing borosilicate glasses such as pyrex that have very low coefficients of thermal expansion (e.g., 32.5× 10$^{-7}$/° C. for borosilicate glass compared to 8.36×10$^{-5}$/° C. for soda-lime glass); and sodium sulfate, sodium chloride, and/or antimony oxide for reducing air bubbles in the glass.

The transparent glazing body may also be designed to include a transparent polymer. Examples of a transparent polymer can include without limitation polycarbonates, polyacrylates, polymethacrylates, polyalkyl alkylacrylates, polymethyl methacrylates, cycloolefin resin polymers, or combinations thereof. Any polymer that can be used to prepare a substantially transparent substrate or a substrate that allows sunlight transmittance may be used to prepare a glazing described herein.

The transparent window glazing body can be designed to include a base surface (e.g., substantially flat base surface) on one side and a repeating ridged pattern (e.g., triangular ridges) on the other side, where the ridges are designed to selectively inhibit sunlight transmission during periods when outside temperatures are high, and also selectively allows uninhibited or minimally inhibited sunlight transmission during cooler periods. However, the base surface may be curved in some instances. Also, there may only be one ridge opposite of the base surface in some instances. The ridges on the side of the window glazing opposite of the base can be formed by alternating sunlight absorbing surfaces and sunlight transmitting surfaces.

The transparent window glazing can be designed to include one or more sunlight absorbing surfaces opposite of the base surface. Each sunlight absorbing surface can have a relative angle with respect to the base surface of about 90 degrees to about 45 degrees, from about 90 degrees to about 60 degrees, from about 90 degrees to about 70 degrees, from about 90 degrees to about 80 degrees, from about 90 degrees to about 95 degrees, or about 90 degrees relative to the base surface. These angles can be oriented upward or downward with respect to vertical. The sunlight absorbing surfaces can each have the same dimensions, where the rise or height of the sunlight absorbing surfaces can be substantially the same dimension. The width of the sunlight absorbing surfaces can vary especially for glazings that are not square or rectangle. Triangle shaped window glazings could have sunlight absorbing surfaces that decrease in width from the base to the tip of the triangle. The sunlight absorbing surface can have a rise or height dimension from about 0.25 mm to about 2.5 cm, from about 0.5 mm to about 2 cm, from about 0.75 mm to about 1.5 cm, from about 1 mm to about 1 cm, or about 5 mm. Optionally, each sunlight absorbing surface can have the same height dimension relative to the base surface.

Each sunlight absorbing surface can be deigned to include a sunlight absorbing coating. The light absorbing coatings can be designed to partially, majorly, or fully cover each of the one or more light absorbing surfaces. The sunlight absorbing coating may be a standard coating layer that is applied to the sunlight absorbing surface, or may be a member having a body that is coupled to the sunlight absorbing surface. The sunlight absorbing coatings can have various properties that absorb sunlight, such as by color absorption, grey absorption, and black absorption of sunlight. In one aspect, the sunlight absorbing coating does not reflect sunlight, reflects less than about 1% of sunlight, reflects less about 10% of sunlight, or reflects less than 25% of sunlight. Significant reflection by the sunlight absorbing surface may be avoided so that a minimal amount of reflected sunlight passes through the sun light transmitting surface and undermine the sunlight absorbing functionality of the glazing intended to reduce sunlight transmittance during periods of more intense sunlight. In one aspect, the sunlight absorbing coating absorbs visible sunlight. In one aspect, the sunlight absorbing coating can absorb infrared (IR) light. In one aspect, the sunlight absorbing coating can absorb ultra-violet (UV) light. In one aspect, the sunlight absorbing coating is from grey to black in color. In one aspect, the sunlight absorbing coating is a non-reflective black, such as a matte black. In one aspect, the sunlight absorbing surface can have about zero (0) reflectance.

The transparent window glazing can be designed to include one or more sunlight transmitting surfaces opposite of the base surface and alternating with the one or more sunlight absorbing surfaces so that each sunlight transmitting surface is located adjacent to one or more sunlight absorbing surfaces. In many cases, the window glazing can be designed to have a large number of sunlight transmitting surfaces and sunlight absorbing surfaces. The surfaces can be designed to be arranged so that each sunlight absorbing surface and sunlight transmitting surface pair forms a ridge protruding from the base surface. The sunlight transmitting surfaces can each be designed to have a relative angle with the base surface of about 1 degree to about 89 degrees, from about 10 degrees to about 80 degrees, from about 20 degrees to about 70 degrees, from about 30 degrees to about 60 degrees, from about 40 degrees to about 50 degrees, or about 45 degrees with respect to the base surface. These angles are respect to a vertical axis with the angles opening up or down. The sunlight transmitting surfaces can each have the same dimensions, where the length (e.g., slope or hypotenuse of right angle ridge) of the sunlight transmitting surfaces can be substantially the same dimension. The width of the sunlight transmitting surfaces can vary especially for window glazings that are not square or rectangle as described with respect to the sunlight absorbing surfaces. In fact, the width of the sunlight absorbing and transmitting surfaces can be the same. The sunlight transmitting surfaces can have a length that is dependent on the height of the sunlight absorbing surfaces, or vice versa. Examples of sunlight absorbing surface length dimensions can range from about 0.25 mm to about 10 cm, from about 0.5 mm to about 6 cm, from about 0.75 mm to about 4 cm, from about 1 mmm to about 2 cm, or about 1 cm. Optionally, each light absorbing surface can have the same length relative to the base surface. Thus, a single window glazing can be designed to have a large number of sunlight transmitting and absorbing surfaces based on the small size of these surfaces with respect to most window glazings that are substantially larger and often sized in the order of feet, yards, or meters.

The figures provided herein illustrate the relative positioning and location of the sunlight absorbing surface and sunlight transmitting surface pairs. These surfaces cooperate as pairs in order to provide one surface that blocks sunlight (e.g., sunlight absorbing surface) from passing through the glazing and the other surface allows sunlight transmittance (e.g., sunlight transmitting surface) during periods of intense sunlight, such as in the summer periods as well as late spring and early autumn. These surfaces also cooperate to allow more sunlight to enter through the sunlight transmitting surface during periods of low intensity sunlight, such as winter as well as early spring and late autumn. Accordingly, the sunlight absorbing surface protrudes out from the glazing sufficiently to form an overhang or eave that inhibits sunlight from contacting the sunlight transmitting surface during summer, but that is sufficiently dimensioned to allow winter sunlight to contact and pass through the sunlight transmitting surface.

In order to implement the functionality of selective sunlight transmittance/absorbance, each sunlight absorbing surface and sunlight transmitting surface pair can be designed to form substantially a ridge having a triangle cross-sectional profile that protrudes oppositely and way from the base surface. The triangle cross-sectional profile can be any of the various well known types of triangles so long as the selective sunlight transmittance/absorbance functionality is retained. In one aspect, each sunlight absorbing surface and sunlight transmitting surface pair can form substantially a right triangle with respect to the base surface. In one aspect, each sunlight absorbing surface and sunlight transmitting surface pair can form substantially an acute angle with respect to a vertical axis that opens upward. In one aspect, each sunlight absorbing surface and sunlight transmitting surface pair can form substantially an obtuse angle with respect to a vertical axis that opens upward.

The sunlight absorbing/transmitting surface pairs can be designed to be arranged such that the glazing has substantially 100% transparency for light normal to the base surface, at least about 95% transparency, at least about 90% transparency, at least about 85% transparency, or at least about 75% transparency. The glazing may also be designed to have substantially 100% sunlight transmission for sunlight normal to the base surface, at least about 95% transmission, at least about 90% transmission, at least about 85% transmission, or at least about 75% transmission.

The window glazing may also be designed to minimize the solar heat gain coefficient (SHGC). As such, the sunlight absorbing coating can minimize the amount of sunlight and thereby solar heat that passes through the window glazing during intense sunlight periods. The SHGC can be about 1:2, 1:5, 1:10, 1:20, 1:30, 1:50, or even 1:100 as defined by the ratio of solar heat (e.g., infrared) passing through the glass to incident solar heat (e.g., solar heat: incident solar heat).

The window glazing may also be designed to minimize the visible transmittance (VT). As such, the sunlight absorbing coating can minimize the amount of visible sunlight that passes through the window glazing during intense sunlight periods. The VT can be about 1:2, 1:5, 1:10, 1:20, 1:30, 1:50, or even 1:100 as defined by the ratio of transmitted visible light divided by incident visible light (e.g., transmitted visible light: incident visible light).

The window glazing can be designed for use as or attachment to any type of window, examples of which are described below. The window glazing may be designed for stationary use in a stationary window frame that does not geographically move or change orientations with respect to the earth. On the other hand, the window glazing can be designed for a mobile structure, where such a design can be based on a stationary directional orientation with respect to the poles of the earth, and average between various orientations with respect to the poles of the earth. That is, the window glazing can be designed to operate when facing in a certain direction, such as due south when north of the equator or due north when south of the equator. The window glazing may also be designed for a vertical window or a window oriented at any angle with respect to vertical and/or the horizon (e.g., non-vertical window). Vertical stationary windows are a common window for which the glazing can be used.

In one aspect, the window glazing can be designed for use as or attachment to a window facing south at a location north of the equator or a window facing north at a location south of the equator. The window glazing can be designed for attachment to a window facing due east to facing due west or any direction therebetween, whether north of the equator, at the equator, or south of the equator. While the description of directional orientation described herein generally refers to geographical locations north of the equator, corresponding geographical locations can be determined south of the equator. As such, reference to directional orientation of the glazing that is facing from east to south to west when north of the equator can also refer to facing from east to north to west when south of the equator. Accordingly, the designs for locations north of the equator referencing a southern directional orientation can also refer to designs for south of the equator referencing northern directional orientation. References to southern directed glazings are for locations north of the equator, which would be equivalent to northern directed glazings for locations south of the equator at a corresponding longitude and latitude. Thus, discussions of glazing designed for a location north of the equator and for a particular southern direction should be applied to the design of glazings for a corresponding latitude and longitude location south of the equator where the direction will be northern.

The window glazing can also be designed for a location at or near the equator. While the equator may be identified on maps and may be capable of being located by global positioning systems (GPS), the wobble of the earth as it spins on its axis causes locations at or near the equator to be similar to locations either north or south of the equator, depending on when in the period of the wobble. That is, a location at the equator may actually receive sunlight similar to if north or south of the equator, which may change depending on point in time of a wobble period. Accordingly, a location at or near the equator may receive sunlight similar to being south or north of the equator, and thereby the glazing can be designed depending on the nature of the sunlight received with respect to southern or northern oriented sunlight.

In some instances, window glazing at a location at the equator can be designed in a manner that considers the directional orientation, whether northern facing or southern facing. When a window glazing is designed for a location at the equator that is facing in a northern direction, the design can use values and equations for a location south of the equator. When a window glazing is designed for a location at the equator that is facing in a southern direction, the design can use values and equations for a location north of the equator. Accordingly, when at the equator, southern facing window glazings can be designed similar to when north of the equator and northern facing window glazings can be designed similar to when south of the equator.

In one aspect, the glazing can be designed to have substantially zero (0) or minimum sunlight transmission when located on a vertical window facing between east to south to west at noon of summer solstice when north of the equator or facing between east to north to west at noon of summer solstice when south of the equator. In one aspect, the glazing can be designed to have substantially zero (0) or minimum sunlight transmission when located on a vertical window facing between east to south to west at a selected time point at a specific geographical location when north of the equator or facing between east to north to west at noon of summer solstice when south of the equator. The different designs of the glazing for the various orientations with respect to the poles of the earth can be calculated using the figures and formulas described in more detail herein. The time points, such as noon of summer solstice, can be varied by minutes, hours, days, weeks, or months. Also, a particular orientation can provide the minimum sunlight transmission over minutes, hours, days, weeks, or months around the time points.

In one aspect, the glazing can be designed to have substantially 100% or maximum sunlight transmission when located on a vertical window facing between east to south to west at noon of winter solstice when north of the equator or facing between east to north to west at noon of winter solstice when south of the equator. The 100% or maximum transmission may be approximated with substantially horizontal sunlight. However, the sunlight absorbing surface may still absorb some sunlight that would otherwise contact the light transmitting surface, and the sunlight that is transmitted may be a maximum at the winter solstice. In one aspect, the glazing can be designed to have substantially 100% or maximum sunlight transmission or a maximum amount of transmission when located on a vertical window facing between east to south to west at noon of winter solstice at a specific geographical location when north of the equator or facing between east to north to west at noon of winter solstice when south of the equator. The different designs of the glazing for the various orientations with respect to the poles of the earth can be calculated using the figures and formulas described in more detail herein.

The time points, such as noon of winter solstice, can be varied by minutes, hours, days, weeks, or months. Also, a particular orientation of the glazing can provide the maximum or minimum sunlight transmission over minutes, hours, days, weeks, or months around the time points.

The window glazing can be designed to be used alone as a window pane, and also can be attached to a base substrate so that the selective sunlight absorbance and transmittance properties can be provided to the base substrate. The base substrate can be a transparent body, such as a transparent body that is commonly used as a window. This allows for a pre-existing window to be retrofit with the window glazing described herein. Retrofitting windows in structures may provide for a significant cost savings for heating and cooling compared to replacing the windows with new energy efficient windows having the glazings described herein. Accordingly, a window can include a transparent base substrate coupled to a transparent window glazing having one or more ridges configured to selectively control sunlight absorbance and transmittance.

The glazing can be attached to the base substrate with an adhesive, such as an optically transparent adhesive. Many adhesives can be prepared to be optically clear, as is standard in many optical industries. The adhesive may include glue proteins. The adhesive can be polymeric. The adhesive can be a pressures sensitive adhesive, contact adhesive, hot adhesive or any other standard type of adhesive. Examples of suitable adhesives can include polycyanoacrylates, polyisobutylenes, nitrocellulose, and others.

The base substrate can be exemplified by glass, such as a window made of glass. The glass can be transparent or optically clear so that substantially 100% sunlight may be transmitted. However, the glass may also be colored, tinted, or darkened. The optical properties of the base substrate can be equivalent to any optical medium that allows sunlight to pass therethrough. Windows and outdoor aquariums are examples of such bases substrates.

The base substrate can also be exemplified by a polymer that allows for sunlight transmission. For example, a transparent polymer can be used for a base substrate such as a window, aquarium, or other. The transparent polymer can be include without limitation polycarbonates, polyacrylates, polymethacrylates, polyalkyl alkylacrylates, polymethyl methacrylates, cycloolefin resin polymers, or combinations thereof and the like.

The window glazing may also be designed to be attached to a window that is facing a southern or designed to face southern when installed in a structure when north of the equator or facing northern when south of the equator. Alternatively, the window glazing may be designed to be attached to a window that is facing east or designed to face east when installed in a structure. In another alternative, the window glazing may be designed to be attached to a window that is facing west or designed to face west when installed in a structure. The window glazing may be configured to be attached to a window or designed for attachment to a window that has any directional orientation with respect to the poles of the earth.

The glazing may also be installed on a window that is configured as a safety window that is shatter resistant. The window receiving the glazing may also be bullet-proof. Any other window may be a substrate for receiving the glazing. When in a building, the window may be installed in a window frame. The window frame can include any components, features, designs or implements that retain the window glazing in a structure. For example, the window may include one or more of the following window components: lite, single or multiple lite, sash, muntins, mullions, replacement window features, new window features, lintel, transom, sill plate, window sill, optical modifying component. The base substrate may be made of any material described herein with regard to the glazings having selective sunlight absorbance and transmittance properties as described herein. The base substrate may be another glazing having the optical properties described herein, where the two glazing substrates are attached back-to-back so that the ridges are oriented away from each other. The base substrate may have the same dimensions as the glazings having optical properties described herein. The base substrate may have a coating that transmits, absorbs, refracts, or reflects sunlight in any amount. The base substrate may be a security glass, such as a two-way mirror. The base substrate may also be a mirror.

The window glazing may be designed to be vertically oriented or alternatively at an angle with respect to vertical. Accordingly, the glazing can be designed to provide the optical properties described herein to a window that is mounted at an angle on a structure with respect to a vertical axis.

The window may be designed as any of the following types of windows: double-hung sash window, single-hung sash window, horizontal sliding sash window, casement window, awning window, hopper window, tilt and slide window, tilt and turn window, transom window, jalousie window, clerestory window, skylight window, roof window, roof lantern, bay window, oriel window, thermal window, fixed window, multi-lit window, egress window, stained glass window, French window, or the like.

Figure 1B:
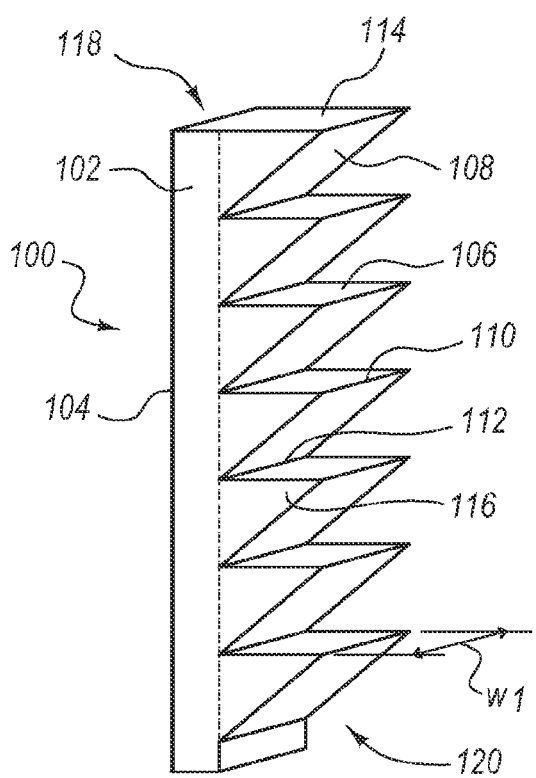
Figure 1C:
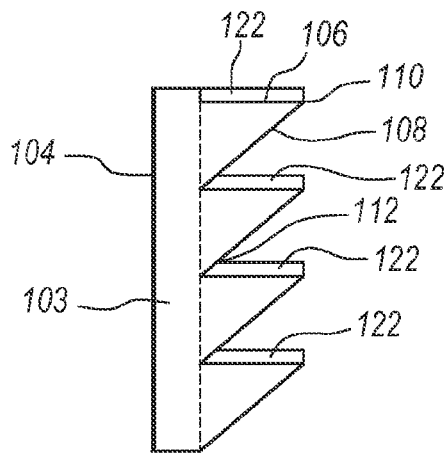

FIGS. 1A-1C show schematic diagrams of an example of a window glazing having selective sunlight absorbance and transmittance arranged in accordance with at least some embodiments described herein. More specifically, FIGS. 1A-1C illustrate an embodiment of a window glazing 100 that is designed to selectively inhibit sunlight from passing therethrough during periods of intense sunlight, such as in summer, and to selectively allow sunlight to pass therethrough substantially uninhibited during periods of less intense sunlight, such as winter. The glazing 100 can include a transparent body 102 that has a base surface 104. The base surface 104 can be part of a substrate 103 that has a substantially uniform dimension d1. The substrate 103 is considered to be a portion of the body 102 that extends from the base surface 104 a dimension d1 within the body 102 at certain locations and to a trough 112 at other locations. The troughs 112, which are discussed in more detail below, are located a distance of dimension d1 from the base surface. The dimension d1 of the substrate 103 is described in more detail below.

The body 102 also has a sunlight absorbing surface 106 opposite of the base surface 104. The sunlight absorbing surface 106 can be oriented at an angle δ1 with respect to the base surface 104, such that angle δ1 opens upward. The sunlight absorbing surface 106 can include a dimension d2, which is the distance the sunlight absorbing surface 106 extends from the trough 112.

A sunlight transmitting surface 108 is included on the body 102 opposite of the base surface 104 and adjacent to the sunlight absorbing surface 106. The sunlight transmitting surface 108 can be oriented at an angle δ2 with respect to the sunlight absorbing surface 106 and at an angle δ3 with respect to the base surface 104. The angles δ2 and δ3 combine to form a right angle. The sunlight transmitting surface 108 can include a dimension d3. Both the sunlight absorbing surface 106 and the sunlight transmitting surface 108 can include a width w1.

The relative positioning of the sunlight absorbing surface 106 and the sunlight transmitting surface 108 can form a ridge 116 that is in the form substantially as a triangle. The particular sunlight absorbing surface 106 and sunlight transmitting surface 108 that form a ridge 116 that protrudes away from the base surface 104 can be considered to be a surface pair. Accordingly, the ridge 116 can have a peak 110 at an intersection of the sunlight absorbing surface 106 and the sunlight transmitting surface 108 that is furthest from the base surface 104. The ridge 116 can also have a trough 112 at an intersection of the sunlight absorbing surface 106 and the sunlight transmitting surface 108 that is closest to the base surface 104. The window glazing 100 is usually configured with a multiple number of ridges 116 that extend from a top 118 of the body 102 to a bottom 120 of the body 102. An optional design, which is shown, has a top sunlight absorbing surface 114 that has a dimension of d3 because it extends all the way from the base surface 104 to a peak 110. Otherwise, the sunlight absorbing surface 106 that is closest to the sun when mounted vertically may have the dimensions of the other sunlight absorbing surfaces 106.

As shown in FIG. 1C, the sunlight absorbing surfaces 106 each can include a sunlight absorbing coating 122. The sunlight absorbing coating 122 can cover the entire surface of the sunlight absorbing surface 106 as illustrated; however, there may be instances where the sunlight absorbing surface 106 is only partially or majorly coated with the coating 122, but not fully coated with the coating 122.

Figure 1D:
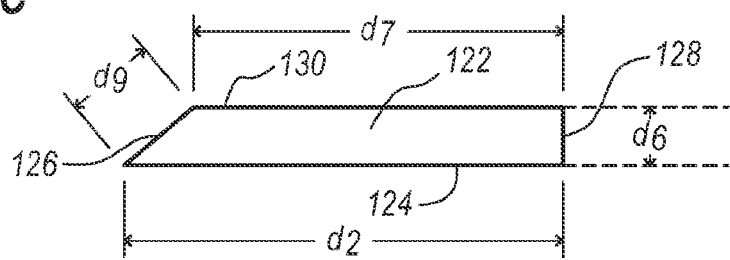
FIG. 1D shows a schematic diagram of an example of a sunlight absorbing coating.

FIG. 1D shows a schematic diagram of an example of a sunlight absorbing coating arranged in accordance with at least some embodiments described herein. More specifically, FIG. 1D shows that the sunlight absorbing coating 122 has a base 124 that has substantially the same dimension d2 as the sunlight absorbing surface. The sunlight absorbing coating 122 can also include a contact surface 126 that contacts an adjacent sunlight transmitting surface 108 that is not part of a ridge surface pair with the sunlight absorbing surface 106 having the sunlight absorbing coating 122 located thereon. The contact surface 126 can include a dimension d9 that is dependent on the relative angle δ2 as well the thickness dimension d6 of the light absorbing coating 122. The sunlight absorbing coating 122 can include a side surface 128 that has the thickness dimension d6. The sunlight absorbing coating 122 can include a top surface 130 that has a dimension d7 that is dependent on the base 124 dimension d2 as well as on the relative orientation between the sunlight absorbing surface 106 and the sunlight transmitting surface 108.

While FIGS. 1A-1C illustrate the glazing 100 having the angle δ1 between the base surface 104 and the sunlight absorbing surface 106 being a right angle (i.e., 90 degrees), the glazing 100 can be designed so that the angle δ1 is at an angle less than or greater than 90 degrees with respect to the vertical axis. Generally, the angles are described with relation to the vertical axis so that the angle opens upward.

Figure 1E:
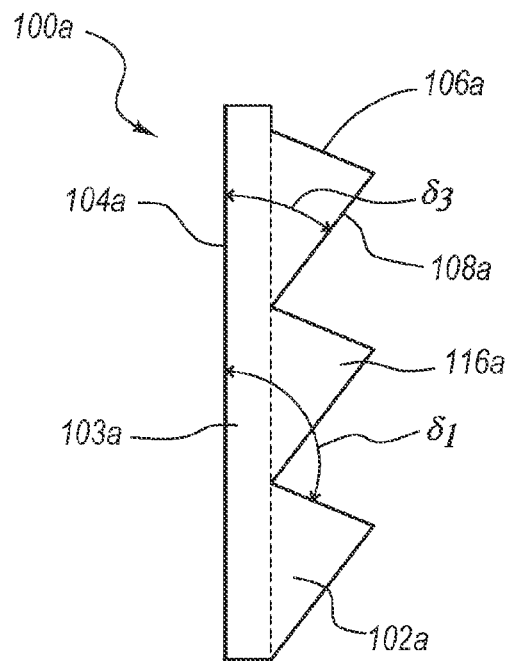
FIG. 1E shows a cross-sectional schematic diagram of an example of a window glazing ridgeline having an oblique orientation that is obtuse with respect to sunlight.

FIG. 1E shows a cross-sectional schematic diagram of an example of a window glazing ridgeline having an oblique orientation that is obtuse with respect to sunlight arranged in accordance with at least some embodiments described herein. As shown in FIG. 1E, a glazing 100a can include a body 102a having a base surface 104a and a sunlight absorbing surface 106a with a relative angle δ1 that is not a right angle. The angle δ1 is shown as an obtuse angle that is greater than 90 degrees with respect to vertical with the angle opening upward. The relative angle δ3 between the base surface 104a and a sunlight transmitting surface 108a may be dependent on the parameters of a ridge 116a. The base surface 104a may be a part of the substrate 103a.

Figure 1F:
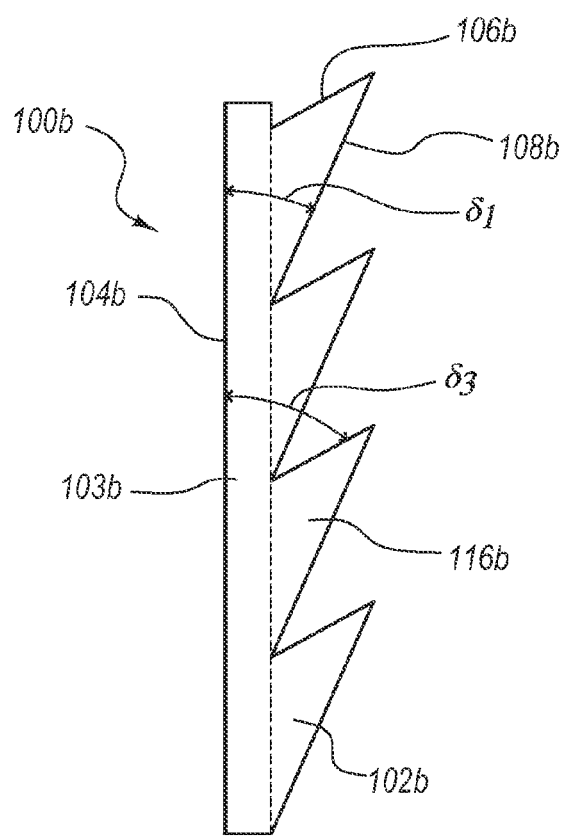
FIG. 1F shows a cross-sectional schematic diagram of an example of a window glazing ridgeline having an oblique angle that is acute with respect to sunlight.

FIG. 1F shows a cross-sectional schematic diagram of an example of a window glazing ridgeline having an oblique angle that is acute with respect to sunlight arranged in accordance with at least some embodiments described herein. As shown in FIG. 1F, a glazing 100b can include a body 102b having a base surface 104b and a sunlight absorbing surface 106b with a relative angle δ1 that is also not a right angle. The angle δ1 is shown to be an acute angle that is less than 90 degrees. The relative angle δ3 between the base surface 104b and a sunlight transmitting surface 108b may be dependent on the parameters of a ridge 116b. The base surface may be a part of the substrate 103b.

Figure 2A:
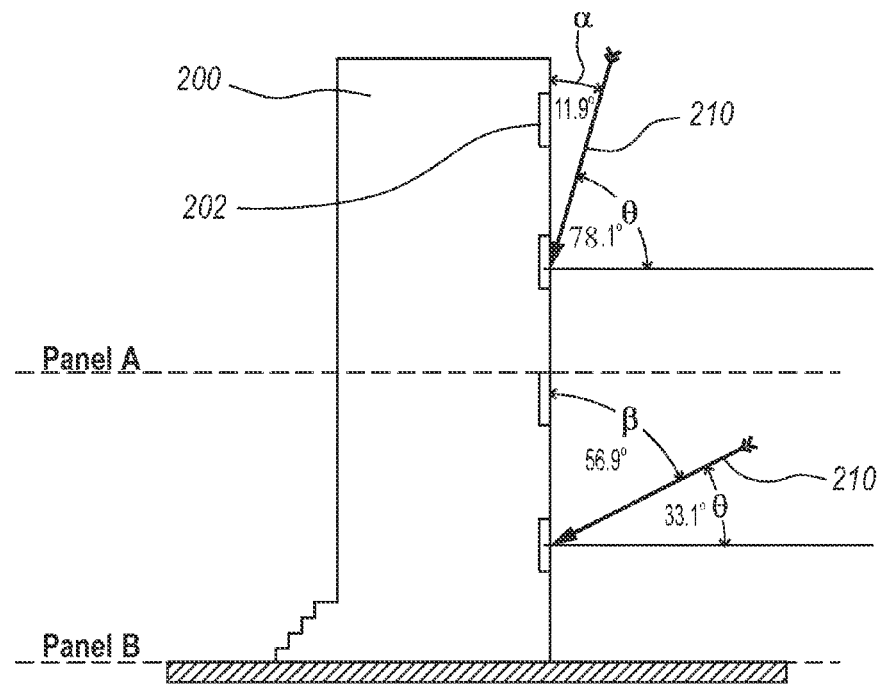
FIG. 2A shows a cross-sectional schematic diagram of an example of a geostationary structure having a window glazing, where Panel A illustrates an approximation of the relationship between sunlight and the window glazing in Tokyo during a summer solstice and Panel B illustrates an approximation of a relationship between sunlight and the window glazing in Tokyo during a winter solstice event.

FIG. 2A shows a cross-sectional schematic diagram of an example of a geostationary structure having a window glazing, where Panel A illustrates an approximation of the relationship between sunlight and the window glazing in Tokyo during a summer solstice and Panel B illustrates an approximation of a relationship between sunlight and the window glazing in Tokyo during a winter solstice event arranged in accordance with at least some embodiments described herein. As shown in FIG. 2A, a structure 200 includes a window glazing 202 as described herein. Panel A of FIG. 2A, shows the window glazing 202 receiving sunlight 210 at an angle α from vertical and an angle θ from horizontal. The angles α and θ are dependent on the time of year (e.g., summer solstice) as well as the geographical location of the structure 200 on the earth. The angle α can be an eigenvalue based on latitude and longitude at the summer solstice at noon. Different geographical locations will have different eigenvalue angle α compared to each other. For example, in Tokyo, the eigenvalue angle α can be about 11.9 degrees with respect to the vertical window glazing 202 and θ can be about 88.1 degrees for a summer solstice event.

Panel B of FIG. 2A, which is on bottom, shows the window glazing 202 receiving sunlight 204 at an angle β from vertical and an angle θ from horizontal. The angles β and θ are dependent on the time of year (e.g., winter solstice) as well as the geographical location of the structure 200 on the earth. The angle β can be an eigenvalue based on latitude and longitude at the winter solstice at noon. Different geographical locations will have different eigenvalue angle β compared to each other. For example, in Tokyo, the eigenvalue angle β can be about 56.9 degrees with respect to the vertical window glazing 202 and θ can be about 33.1 degrees for a winter solstice event.

The eigenvalues α and β are used to determine the parameters of the window glazing 202. The eigenvalues for winter and summer solstice events can be found in the literature.

Figure 2B:
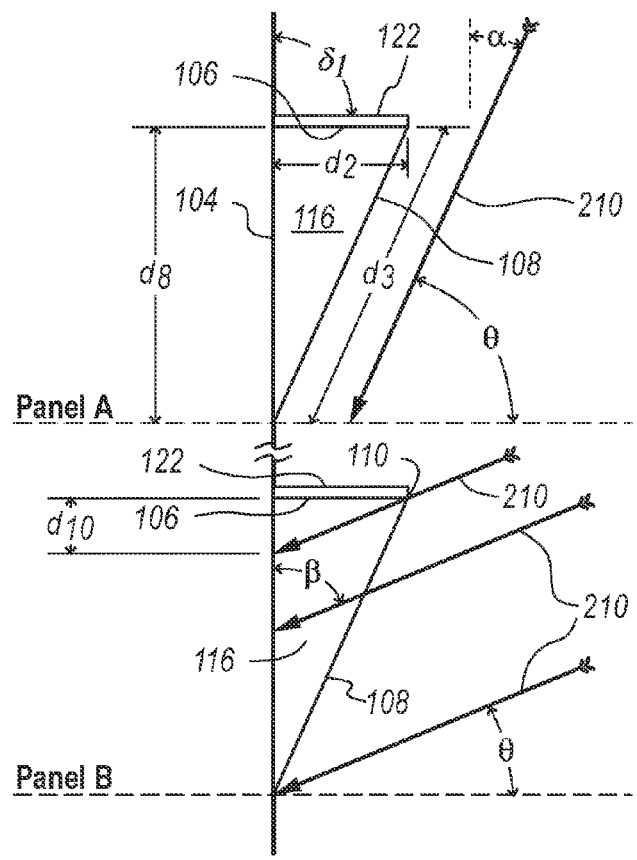
FIG. 2B shows a graph illustrating the geometrical relationship between the window glazing and sunlight of FIG. 2A.

FIG. 2B shows a graph illustrating the geometrical relationship between the window glazing and sunlight of FIG. 2A arranged in accordance with at least some embodiments described herein. More specifically, FIG. 2B illustrates a graph that is related to the structure 200 of FIG. 2A and includes the sunlight absorbing coating 122 on the sunlight absorbing surface 106 in relation to the sunlight transmitting surface 108 and the base surface 104. Panel A of FIG. 2B shows sunlight 210 having the same orientation of the sunlight transmitting surface 108 so that the sunlight 210 is not able to pass therethrough due to the sunlight absorbing surface 106 and sunlight absorbing coating 122 absorbing the sunlight 210. The transmittance (T) is substantially zero (0) or minimal with the illustrated orientation. The ridge 116 has a dimension d2 for the height of the sunlight absorbing surface 106 and the light absorbing coating 122. The ridge 116 also has a dimension d8 for the base surface 104 portion that corresponds to the ridge 116. The dimensions d2 and d8 can be calculated and/or determined based on the eigenvalue a for the summer solstice event. For example, when the angle δ1 is a right angle or 90 degrees, the parameters of the ridge 116 can be calculated with Equation 1: $T=T_0-(d2/d8*\tan\Theta)$, where $T_0$ is the strength of sunlight 210 on the Vernal Equinox and the Autumnal Equinox that can be looked up or determined for a particular geographical location at a longitude and latitude. The transmittance T can be set to zero (0) for determining the parameters for the summer solstice event so that the dimension d2 of the sunlight absorbing surface 106 and sunlight absorbing coating 122 can be calculated when the value of d8 is set. However, the value of dimension d2 may be set and the value for dimension d8 may be calculated.

As shown in Panel B of FIG. 2B, the calculated values allow for sunlight 210 to pass through the sunlight transmitting surface 108. Also, sunlight that is substantially horizontal as shining from the horizon can pass through the sunlight transmitting surface 108 substantially uninhibited or at a maximum T value.

While the ridge 116 is designed for maximum sunlight transmission at noon at a winter solstice event compared to noon at other times of the year, some sunlight may be blocked or absorbed by the sunlight absorbing surface 106 or sunlight absorbing coating 122. This is shown by the sunlight 210 arrow that contacts the peak 110 and intersects the base surface 104 to form a triangle area of blocked sunlight defined by dimension d10 (e.g., portion of base surface 104 that light does not pass through), dimension d2, and the distance extending from peak 110 to the base surface 104 in the line of the sunlight 210. This region can be calculated to determine an amount of sunlight 210 that is absorbed by the sunlight absorbing coating 122 at noon on a winter solstice event.

The dimensions and parameters of the glazing can be determined for a particular geostationary location. As such, the height (d2) of a sunlight absorbing surface 106 can be determined with respect to the length (d8) of the base surface 104 under a particular ridge 116. The length (d3) of the sunlight transmitting surface can be determined so that the sunlight absorbing surface 106 and sunlight transmitting surface 108 can form a ridge 116 as described herein. In one aspect, the height (d2) of a sunlight absorbing surface 106 can be calculated from a length (d8) of the base surface under a sunlight absorbing surface 106 and sunlight transmitting surface 108 ridge 116 pair.

In one embodiment, a length (d8) of the base surface under a sunlight absorbing surface 106 and sunlight transmitting surface 108 ridge 116 pair can be calculated from Equation: d$8$=d$2(\tan \Theta)$. This equation can also be used to calculate any of the parameters when the requisite number of other parameters is known or a ridge 116. The Pythagorean Theorem (i.e., d$3^2$=d$2^2$+d$8^2$) can also be used to determine the lengths of the ridge 116 surfaces.

Additionally, the properties of the window glazing, sunlight absorbing surfaces, light transmitting surfaces, base surface or other can be determined by assuming reflectivity is zero (0) for one or more of the surfaces. The properties of the window glazing, sunlight absorbing surfaces, sunlight transmitting surfaces, base surface or other can be determined by having $T_O$ be the difference between the strength of the sunlight and the surface reflectivity. The value of $T_O$ can be based on a portion, a majority, or a whole base surface.

In one example, a window glazing designed for Tokyo would have d2 as 1 cm and d8 is 30.1 cm. Other dimensions could be used with the 1:30.1 ratio for d2:d8 so that a 1 mm dimension d2 results in a 30.1 mm dimension d8.

In one embodiment, a structure can include a window glazing described herein. The window glazing can be oriented so as to be facing outside of the structure. The window glazing may be located on an outer wall of the structure. The structure can be geostationary, such as with an ordinary building.

The structure can have any of the following characteristics: the structure is a building; the structure is geographically stationary (e.g., building); the structure is an aquarium; the structure is a house; the structure is portable; the structure is not geostationary (e.g., movable structure, such as a trailor); or the structure is a recreational vehicle, such as a motorhome.

The characteristics of a window glazing having selective sunlight absorbance and transmittance can be designed by using any of the features illustrated in the figures or described herein. These characteristics can be used in a method of designing a selective sunlight absorbing and transparent window glazing that includes determining the orientation angles of one or more sunlight absorbing surfaces relative to an opposite base surface. The orientation angles can include a relative angle of the sunlight absorbing surface with the base surface being about 90 degrees to about 45 degrees or other angles as described herein.

The method of designing can also include determining dimensions of the one or more sunlight absorbing surfaces. The dimensions of the sunlight absorbing surface can include a height (i.e., d2) of the surface that extends away from the base surface that can be designed with relation to parameters of the window and geographical location. The dimensions of the sunlight absorbing surface can also a width (i.e., $\omega$1) that is determined with respect to parameters of the window.

The method of designing a window glazing can also include determining the orientation angles of one or more sunlight transmitting surfaces relative to the one or more sunlight absorbing surfaces and relative to the opposite base surface. The orientation angle can be determined to include a relative angle with the base surface of about 1 degree to about 89 degrees or other angle as described herein.

The method of designing a window glazing can include determining dimensions of the one or more sunlight transmitting surfaces. The dimensions can be determined with respect to the dimensions of the other surfaces and angles of a ridge or set as a reference point.

The method of designing a window glazing can include determining sunlight absorbing coating characteristics for application to the sunlight absorbing surfaces. The sunlight absorbing coating characteristics can vary depending on the use of the window. The sunlight absorbing characteristics can include absorbance of one or more wavelengths of light. As such, the absorbance can be over a range of wavelengths, such as IR wavelengths, or be specific wavelengths.

The method of designing a window glazing can include using any of the method operations described herein in any order, combination, or number sufficient for preparing a glazing as described herein. An example of a method of designing a window glazing can include: determining orientation angles of one or more sunlight transmitting surfaces relative to an opposite base surface and having a relative angle with the base surface of about 1 degrees to about 89 degrees or other degree described herein; determining dimensions of the one or more sunlight transmitting surfaces; determining orientation angles of one or more sunlight absorbing surfaces relative to the one or more sunlight transmitting surfaces and to the opposite base surface and having a relative angle with the base surface of about 90 degrees to about 45 degrees or other degrees described herein; determining dimensions of the one or more sunlight absorbing surfaces; and determining sunlight absorbing coating characteristics for application to the sunlight absorbing surfaces.

The method of designing a window glazing can include determining a number of sunlight transmitting surfaces and a number of sunlight absorbing surfaces that alternate with the sunlight transmitting surfaces. The method can also include determining parameters of a junction between a sunlight transmitting surface with respect to a sunlight absorbing surface at a peak of a sunlight transmitting surface and sunlight absorbing surface pair. The method can further include determining parameters of a junction between a sunlight transmitting surface with respect to a sunlight absorbing surface at a trough between adjacent ridges. The method can further include determining relative orientation of a sunlight absorbing surface and a sunlight transmitting surface of a ridge pair so as to form a ridge protruding from the base surface.

The design method can include determining the composition of the glazing. The composition can be determined to include a glass, such as a glass described herein. The composition can be determined to be a polymer, such as a polymer described herein.

The design method can include determining whether each of the one or more sunlight absorbing surfaces is about 90 degrees relative to the base surface. Any number of the light absorbing surfaces can have a right angle. A right angle also allows for easier designing.

The method can include determining whether each of the one or more sunlight transmitting surfaces is from about 1 degree to about 45 degrees relative to the base surface. The angle can be any of the values that can be determined or calculated as described herein. The method can also include determining whether each sunlight absorbing surface has the same height relative to the base surface and each sunlight transmitting surface. The method can also include determining whether each of the sunlight transmitting surfaces have the same dimensions. The method can include determining whether each sunlight transmitting surface has the same length relative to the base surface and each sunlight absorbing surface.

The method can include determining whether each sunlight absorbing surface and sunlight transmitting surface pair forms substantially a triangle with respect to the base surface. This can include determining whether each sunlight absorbing surface and sunlight transmitting surface pair forms substantially a right triangle with respect to the base surface. This operation can also include determining whether each sunlight absorbing surface and sunlight transmitting surface pair forms substantially an acute angle. This operation may also include determining whether each sunlight absorbing surface and sunlight transmitting surface pair forms substantially an obtuse angle. Angles are determined relative to a vertical axis with the angles opening upwards.

The method can also include determining that a sunlight absorbing coating to be applied to the sunlight absorbing surface has a characteristic that absorbs visible light. This operation can include determining that the sunlight absorbing coating has a characteristic that absorbs infrared light. This operation can also include determining that the sunlight absorbing coating has a characteristic that absorbs visible and infrared light. This operation may also include determining that the sunlight absorbing coating is gray in color. The method may also include determining that the sunlight absorbing coating is black in color.

The method can include determining whether the window glazing is to be configured for attachment to a stationary window. This operation can include determining whether the window glazing is to be configured for attachment to a vertical stationary window or a non-vertical stationary window.

The method can include determining whether the window glazing is to be configured for attachment to a window facing southerly at a location northerly of the equator or a window facing north at a location south of the equator. Alternately, the method can include determining whether the window glazing is to be configured for attachment to a window facing east. In another alternative, the method can include determining whether the window glazing is to be configured for attachment to a window facing west.

The method can also include determining that each of the sunlight absorbing surfaces is substantially normal to the base surface and has a height of about 1 mm to about 1 cm. Alternatively, the angle or height may vary as described herein.

The method can include determining whether the glazing has substantially 100% transparency for light normal to the base surface. However, any other percentage transparency can be used. Transparency is considered to be the translucency of the material or the quality of the image viewable through the glazing.

The method can include determining whether or not the glazing is to be configured for a non-vertical stationary window.

The method can also include determining that the glazing is to be configured to have substantially zero (0) or minimum sunlight transmission when located on a vertical window facing between east to south to west at noon of summer solstice when north of the equator or between east to north to west when south of the equator. Alternately, the method can include determining that the glazing is configured to have substantially zero (0) or minimum sunlight transmission when located on a vertical window facing between east to south to west at noon of summer solstice at a specific geographical location.

The method can include determining that the glazing is to be configured to have substantially 100% or maximum light transmission when located on a vertical window facing between east to south to west at noon of winter solstice when north of the equator or between east to north to west when south of the equator. However, a portion of the sunlight may still be blocked or absorbed by the sunlight absorbing surface and sunlight absorbing coating. Alternately, the method includes determining that the glazing is configured to have substantially 100% or maximum light transmission when located on a vertical window facing between east to south to west at a particular time point at a specific geographical location when north of the equator or between east to north to west when south of the equator.

Figure 3:
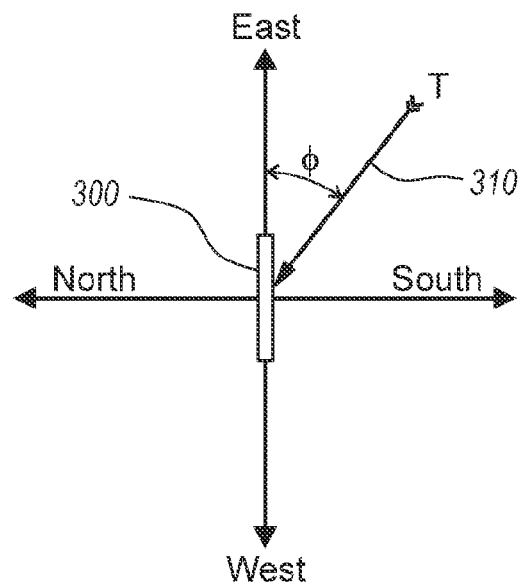
FIG. 3 shows a graph illustrating a relationship between a window glazing facing south and sunlight with respect to the earth.

An example of a window glazing can include ridges that are designed for a southerly facing window when north of the equator or a northerly facing window when south of the equator. The glazing can be determined to be set vertically from the ground and so that the peaks of the ridges are facing substantially south as illustrated in FIG. 3. FIG. 3 shows a graph illustrating a relationship between a window glazing facing south and sunlight with respect to the earth arranged in accordance with at least some embodiments described herein. More specifically, FIG. 3 shows a glazing 300 as described herein facing south and receiving incident sunlight 310, and thereby north of the equator. However, the same calculations can be made for a north facing glazing 300 when south of the equator. While due south when north of the equator or due north when south of the equator may have advantages, it is suitable if the glazing varies to some degree. The light transmission or the glazing can be calculated by using Equation 1 and Equation 2: $T=T_0-a/b \tan \Theta_T$—Equation 1; and $\Theta_\phi=\tan^{-1}(\tan \Theta/\sin \phi)$—Equation 2; wherein, $T_0$ is strength of sunlight on Vernal Equinox and Autumnal Equinox; $\Theta$ is an angle between sunlight and ground, and if sunlight is horizontal $\Theta$; $\phi$ is an angle between directly east and sunlight, and if sunlight is directly east $\phi$ is zero (0); a is height of the light absorbing surface relative to the base surface which can also be defined as d2 as described herein; b is the length of the base under a light absorbing surface and light transmitting surface pair which can also be defined as d8 as described herein; and $0 \leq \Theta \leq \pi/4$ and $0 \leq \phi \leq 2\pi$. The light transmittance between the Vernal Equinox and the Autumnal Equinox may be determined using the following parameters: $2\pi > \phi > \pi$, if $\phi$ is within this range, T is zero (0) or minimum. If the sunlight entering into the room is from the directly east direction, then $\phi=0$. If the sunlight entering into the room is from the horizon direction, then $\Theta=0$.

When using the equations as presented herein, $T_0$ is determined based on the whole glazing base surface. Also, the equations provided herein are described in connection to a location north of the equator for glazings oriented from east to south to west; however, the same equations can be applied for locations south of the equator for glazings oriented from east to north to west. As such, the discussions herein for glazings at geographical locations north of the equator can also be applied to geographical locations south of the equator by changing southern directions with northern directions as described above. Accordingly, reference to directionalities that are southerly should be considered to be north of the equator, and the same equations can be used for directionalities that are northerly when located south of the equator.

Accordingly, sunlight is absorbed by the glazing of this invention during the time between sunrise and noon so that the intensity of the sunlight which enters into the room is reduced. As such, during the time between noon and sunset, the sunlight that enters into the room increases. The glazing parameters can be configured according to incident direct sunlight.

The parameters described herein can be used for estimating the values to prepare a glazing that functions as describe herein. In practice, it can be more complicated because of scattering light. However, the assumptions and estimations or any deviations may be allowable as long as sufficient selective sunlight absorbance and transmittance is achieved. Equation 1 can be used to determine values for the period between the Autumnal Equinox and the winter solstice. Equation 2 can be used to determine values for the period between the winter solstice and the Vernal Equinox.

When the glazing is set vertically from the ground and is facing south when north of the equator (or facing north when south of the equator), the sunlight is absorbed by the sunlight absorbing coating during the time between the sunrise and noon, during which the sunlight which enters into the room is reduced as time moves toward noon. For example, at noon of the summer solstice, the direct sunlight that is transmitted through glazing can be about zero (0) or minimum. During the time between noon and the sunset, the sunlight which enters into the room can increase from the minimum at noon and is relative to the amount of sun entering the light transmitting surface as the sun moves toward the western horizon. During the period between the Vernal Equinox and the Autumnal Equinox, if $\phi$ is within the range of $2\pi > \phi > \pi$, the direct sunlight entering into the room is zero (0) or minimum.

Figure 4:
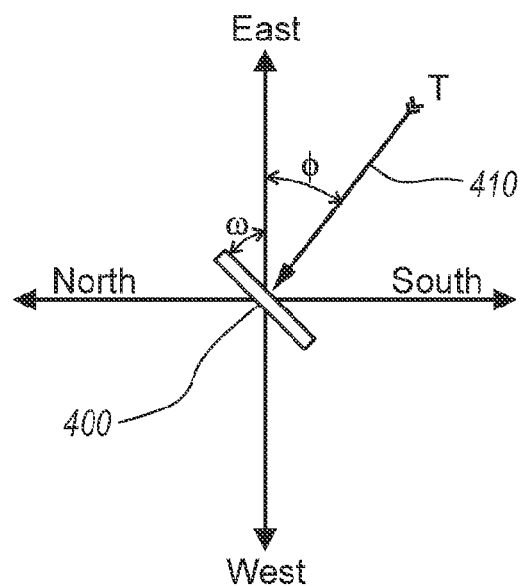
FIG. 4 shows a graph illustrating a relationship between a window glazing facing southeast and sunlight with respect to the earth.

Another example of a window glazing can include ridges that are designed for a southeast facing window when north of the equator (or facing northeast when south of the equator). The glazing can be determined to be set vertically from the ground and so that the peaks of the ridges are facing substantially southeast as illustrated in FIG. 4. FIG. 4 shows a graph illustrating a relationship between a window glazing facing southeast and sunlight with respect to the earth arranged in accordance with at least some embodiments described herein. More specifically, FIG. 4 shows a glazing 400 as described herein facing southeast and receiving incident sunlight 410. While due southeast may have advantages, it is suitable if the glazing varies to some degree. The window glazing can be designed such that the sunlight transmission is calculated by Equation 1 and Equation 3: $T=T_0-a/b \tan \Theta_\phi$—Equation 1; and $\Theta_\phi=\tan^{-1}(\tan \Theta/\sin(\phi+\omega))$—Equation 3; wherein, $T_0$ is strength of sunlight on Vernal Equinox and Autumnal Equinox; $\Theta$ is an angle between sunlight and ground, and if sunlight is horizontal $\Theta$; $\phi$ is an angle between directly east and sunlight, and if sunlight is directly east $\phi$ is zero (0); $\omega$ is an angle between due east and the base surface; a is height of the sunlight absorbing surface relative to the base surface and can also be referred to as d2; b is the length of the base under a sunlight absorbing surface and sunlight transmitting surface pair and can also be referred to as d8; and $0 \le \Theta \le \pi/4$ and $0 \le \phi \le 2\pi$. If the base surface is normal to due east, then $\omega=\pi/2$ and Equation 4 is used in place of Equation 3, where Equation 4 is as follows: $\Theta_\phi=\tan^{-1}(\tan \Theta/\sin(\phi+\pi/2))$—Equation 4. If $2\pi > \phi+\omega > \pi$, then T is zero (0) or minimum. However, if $2\pi > \phi+\omega > \pi$, the direct sunlight entering into the room is zero (0) or minimum. The sunlight that enters into the room can be reduced during the period between sunrise and noon, and may be zero (0) or minimum after the noon; however, it should be understood that more light may enter the sunlight transmitting surface as the sun is closer to the horizons, east or west. Equation 3 can be used for a window glazing to be facing any direction from east to south to west to north when north of the equator or facing any direction from east to north to west when south of the equator with $\omega$ being shown in FIG. 4.

In the instance that the window glazing is to be directed west, Equation 3 is used with $\omega=3\pi/2$ (See Equation 5). Equation 5 is: $\Theta_\phi=\tan^{-1}(\tan \Theta/\sin(\phi+3\pi/2))$. The variables for the equations used for calculating the parameters of a window glazing that faces west can be reviewed in FIGS. 3 and 4. Accordingly, a window glazing configured for facing west can be designed so that the light transmission is calculated by Equation 1 and Equation 5: $T=T_0-a/b \tan \Theta_\phi$—Equation 1; $\Theta_\phi=\tan^{-1}(\tan \Theta/\sin(\phi+3\pi/2))$—Equation 5, wherein, $T_0$ is strength of sunlight on Vernal Equinox and Autumnal Equinox; $\Theta$ is an angle between sunlight and ground, and if sunlight is horizontal $\Theta$; $\phi$ is an angle between directly east and sunlight, and if sunlight is directly east $\phi$ is zero (0); $\omega$ is $3\pi/2$; a (i.e., d2) is the height of the sunlight absorbing surface relative to the base surface; b (i.e., d8) is the length of the base under a sunlight absorbing surface and sunlight transmitting surface pair; and $0 \le \Theta \le \pi/4$ and $0 \le \phi \le 2\pi$. Also, if $2\pi > \phi+\omega > \pi$, then the direct sunlight entering the room (i.e., T) is zero (0) or a minimum. The glazing for facing west can be designed so that the sunlight that passes through the sunlight transmitting surface from sunrise until noon is zero (0) or minimum, and the amount of sunlight that passes through the sunlight transmitting surface increases after the noon as the sun sets towards the western horizon.

In the instance that the window glazing is configured for facing north, Equation 3 is used with $\omega=\pi$. As such, Equation 6 is: $\Theta_\phi=\tan^{-1}(\tan \Theta/\sin(\phi+\pi))$. However, if $2\pi > \phi+\omega > \pi$, the direct sunlight entering into the room is zero (0) or minimum, and thereby for a north facing window glazing, the sunlight which can pass through the glazing during the daytime is zero (0) or minimum. If the window is pointed south, Eq. 3 is used for this situation, w=0.

Figure 5:
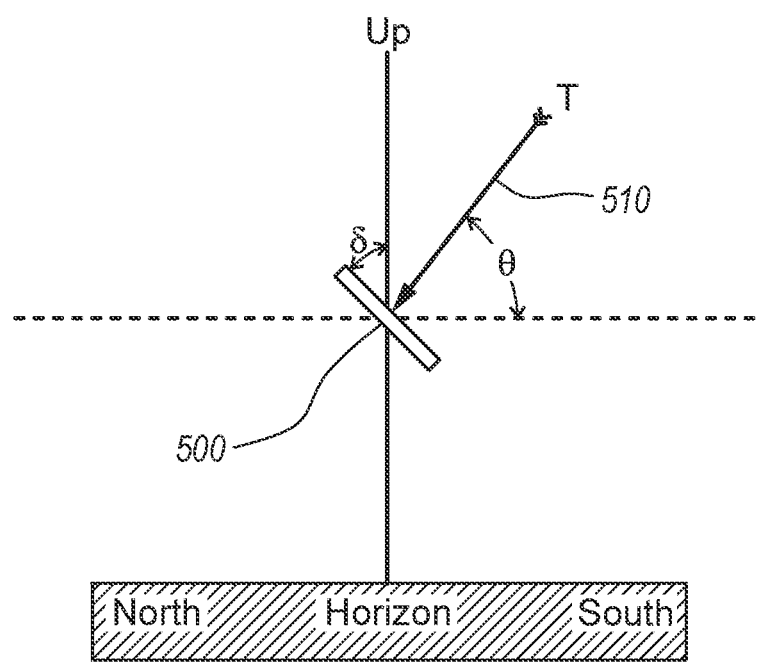
FIG. 5 shows a graph illustrating a relationship between a window glazing having a non-vertical and sunlight with respect to the horizon.

FIG. 5 shows a graph illustrating a relationship between a window glazing having a non-vertical and sunlight with respect to the horizon arranged in accordance with at least some embodiments described herein. More specifically, FIG. 5 provides a graphical illustration of a window glazing 500 having an orientation other than vertical. As shown, the window glazing 500 is at an angle $\delta$ with respect to the vertical axis. The window glazing can be configured to be non-vertically oriented, wherein the sunlight transmission is calculated by Equation 1 and Equation 7: $T=T_0-a/b \tan \Theta_\phi$—Equation 1; $\Theta_\phi=\tan^{-1}(\tan(\Theta-\delta)/\sin(\phi+\omega))$—Equation 7; wherein, $T_0$ is strength of sunlight on Vernal Equinox and Autumnal Equinox; $\Theta$ is an angle between sunlight and ground; $\phi$ is an angle between directly east and sunlight, and if sunlight is directly east $\phi$ is zero (0); $\omega$ is an angle between due east and the direction the glazing faces; $\delta$ is an angle between the base surface and vertical; a (i.e., d2) is height of the light absorbing surface relative to the base surface; b (i.e., d8) is the length of the base under a light absorbing surface and light transmitting surface pair; and $0 \le \Theta \le \pi/4$ and $0 \le \phi \le 2\pi$.

In one embodiment, if a (i.e., d2) is known or set, then b (i.e., d8) can be calculated from the following equation: b=a (tan Θ), where a is the height of the sunlight absorbing surface and b is the length of the base surface for a particular ridge.

In one embodiment, surface reflectivity is assumed to be zero (0) in a method of designing a glazing as described herein. The surface reflectivity; however, may be used and can be determined based on: the air refractive index (e.g., $n_0$) and the refractive index of the glazing e.g., $n_1$), the wavelength of the sunlight ($\lambda$), and the angle of incidence of the sunlight (Θ'). When Θ' is near 0°, the surface reflectivity is small and can be approximated as zero (0). When Θ' is near 90°, the surface reflectivity is high, and it may be useful to factor in the surface reflectivity when designing a window glazing. The use of a matt black sunlight absorbing coating can inhibit the effects of reflectivity. In one aspect, $T_0$ can be determined as the difference between the strength of the sunlight and the surface reflectivity.

In one embodiment, a method of designing a window glazing can include determining a height of a sunlight absorbing surface and length of the base surface under a sunlight absorbing surface and sunlight transmitting surface pair. These values can be determined by one or more being set and then calculating the other values from the equations provided herein.

In one aspect, the design method can also include determining a height of a sunlight absorbing surface from a length of the base surface under a sunlight absorbing surface and sunlight transmitting surface pair. In this instance, the length of the sunlight transmitting surface may be set so that the height of the sunlight absorbing surface can be calculated with the equations provided herein.

In one aspect, the design method can include determining a length of the base surface under a sunlight absorbing surface and sunlight transmitting surface pair from b=a(tan Θ). In this equation, "a" is the same as d2 and "b" is the same as d8 as shown in the figures and described herein.

After the parameters of a particular glazing are determined for a specific geographical location and orientation with respect to vertical, the glazing can then be manufactured. It should be recognized that the glazing design process may be completely separate or combined with a method of manufacture. That is, the glazing may be designed by one entity and then manufactured by a separate entity. Generally, traditional methods for preparing window glazings can be used for preparing the glazings described herein. When the glazing is prepared from glass, the methods of manufacture can include general methods of float glass manufacturing that use floating molten glass on a bed of molten metal (e.g., tin) to provide flat surfaces. This process can be done in a mold to provide the sunlight absorbing and transmitting surfaces. When prepared from a transparent polymer, the glazing can be prepared by standard manufacturing practices for preparing molded sheets. Generally, manufacture methods for transparent polymers include heating the polymer above the glass transition temperature so as to soften the polymer for molding in a mold having dimensions of the glazing. Thus, once the glazing has been designed for a particular use, the glazing can be manufactured by various techniques depending on the material being used.

In one embodiment, a computing method of designing a light absorbing, transparent window glazing is provided. Such a computing method can include: determining a geographical area for the window glazing; obtaining an eigenvalue $\alpha$ for noon during summer solstice for the geographical location; obtaining an eigenvalue $\beta$ for noon during winter solstice for the geographical location; inputting the eigenvalues $\alpha$ and $\beta$ into a computing system; and computing, with the computing system, a design of one or more ridges for the window glazing, each of the one or more ridges including a light absorbing surface that protrudes away from a base to a tip formed with a light transmitting surface sloped from the tip toward the base. The geographical location can be used to obtain the eigenvalues, which are the angle of light that would strike the window glazing for the geographical location for the different solstice events. These values may be obtained as described herein.

In one embodiment, the computing method can include determining an orientation angle for the light absorbing surface with respect to the base for each ridge. The determination of the orientation angle for the light absorbing surface with respect to the base can be from about 90 degrees to about 45 degrees acute or obtuse for each ridge. That is, the angle can be 45 degrees opening up (obtuse) or opening down (acute). A determination of the orientation angle for the light transmitting surface with respect to the base for each ridge can also be computed. The orientation angle for the light transmitting surface with respect to the base can be from about 1 degree to about 89 degrees acute for each ridge. The computing method can also include designing the window glazing to have a protruding dimension of the light absorbing surface of each ridge to be about 1 mm to about 1 cm, calculating a length of the light transmitting surface based on the protruding dimension of the light absorbing surface.

The computing system can also be used to determine dimensions of the light absorbing surface and light transmitting surface for each ridge. The dimensions can be calculated based on the geographical location and directionality the glazing will face when installed as well as based on criteria for the glazing that are predetermined. The dimensions that are calculated or defined can include a vertical dimension and horizontal dimension of the surfaces or the overall glazing.

In one embodiment, the angle of the light absorbing surface can be calculated or determined to be about 90 degrees relative to the base for each ridge. Also, the angle of the light transmitting surfaces can be calculated or determined to be from about 1 degree to about 45 degrees relative to the base for each ridge. Additionally, the ridges can me defined to have the same dimensions, where each ridge: is substantially a right triangle with respect to the base and light absorbing surface forming a right angle; substantially an acute angle; or substantially an obtuse angle.

In one embodiment, some of the values of the parameters of the window glazing and individual ridges can be defined and/or input into a computing system. For example, the computing method can include inputting into the computing system: an angle of orientation for the window glazing with respect to the poles of the earth; and/or an angle of orientation for the window glazing with respect to vertical. The computing method can also include inputting into the computing system ranges of values for one or more parameters of the ridge. The computing method can also include inputting into the computing system set values for one or more parameters of the ridge.

In one embodiment, the equations provided herein can be used in the computing method for calculating the values of parameters of the window glazing or individual ridges. For example, the equations can be used for calculating a ratio of protruding dimension of light absorbing surface and base dimension of base under the ridge. Other values of the glazing or ridges can also be calculated using the equations.

In one embodiment, a method of manufacturing a transparent window glazing can include the following described procedure. Obtaining the design parameters of a window glazing as described herein and then manufacturing the window glazing by a suitable process. The manufactured glazing can be used alone as a window glazing. Alternatively, the glazing may be designed for application to a base substrate, and then the manufacturing method includes coupling the transparent window glazing to the transparent base substrate, such as a window or glass substrate. In another alternative, a glazing can be manufactured by being formed directly on a pre-existing substrate, such as a glass window.

The manufacturing operations can vary and are dependent on the material to be prepared into a glazing. However, one operation can include preparing a composition for preparation into the glazing. For example, the composition can be a sol-gel composition having tetraalkoxysilane. The sol-gel composition can then be cast in an appropriate mold or onto an appropriate substrate so as to have a surface geometry of the designed window glazing. Also, the sol-gel composition can be molded to have the desired shape of the ridges of the glazing. Embossing or other techniques can be used to press the desired shape of the ridges into the glazing. After the shape of the glazing is imparted to the sol-gel composition, the composition can be solidified into a useful window glazing. The manufacturing can utilize heating and drying for solidification of the sol-gel composition into a glazing.

In one embodiment, the glazing can be manufactured by heating and/or calcinating a window glazing composition that has the determined glazing shape. The heating and calcinating can be dependent on the material being used, and as such the temperatures and times vary depending on the material.

In one embodiment, the method of manufacturing the glazing can include covering the sunlight absorbing surfaces with the sunlight absorbing coating. The sunlight absorbing coating can be applied to the material before or after the shape of the glazing has been imparted into the material. In one instance, the sunlight absorbing coating is applied to the material, and then an embossing techniques imprints the desired shape of the ridges into the material so that the sunlight absorbing coating is positioned on or as a sunlight absorbing surface. In another instance, the sunlight absorbing coating can be applied to the glazing after the ridges have been formed. The sunlight absorbing coating can be self-adherent to the glazing or it can be a solid member that is adhered thereto with an adhesive. The coating can be applied as a liquid or solid. When applied as a liquid, the material can solidify into a solid material. Liquid coating applications can be by painting, rolling, brushing, spraying, inkjet printing, and the like. Photoresist techniques can also be employed to provide the coating. The coating can be a soft flexible material or it can be hard and non-flexible.

In one embodiment, the method of manufacturing can include mixing individual ingredients together to form a composition to be prepared into the glazing. For example, the method can include mixing a tetraalkoxysilane, an alcohol, water, and an acid under the room temperature when the glazing includes the alkylsilane. This example can include mixing the composition under 60° C. for 1 hour. When this composition is used, the glazing can be calcinated under 1100° C. for half day.

In one embodiment, the method of manufacturing can include preparing a sol dispersion for using in preparing the glazing. The sol dispersion can be obtained from a partially hydrolized and partially condensed tetraalkoxysilane condensation product. The sol dispersion can be prepared through an evaporator condensing method which avoids gelation. Other methods can be used that avoid gelation of the sol-gel composition. The sol dispersion can then be applied to a suitable substrate for preparing the glazing, such as by application to a glass substrate that will be included in the window glazing. Alternatively, the substrate can be configured so that glazing is removed therefrom prior to use as a window glazing. That is, the glazing can be detached from the substrate before use. After application to the substrate, the sol dispersion can be dried. For example, the sol dispersion can be dried on a glass window substrate.

In the instance that a sol dispersion is prepared for the glazing, the method of manufacture can include applying a sunlight absorbing coating on the dried sol dispersion. The application of the sunlight absorbing coating can be as described herein. In one example, the sunlight absorbing coating can include a black material that is applied onto the dried sol dispersion in areas that correspond with sunlight absorbing surfaces.

In one embodiment, the sunlight absorbing coating on the sol dispersion can be imparted to the sunlight absorbing surface by pressing a mold into the dried sol dispersion in order to form shape of the window glazing. This process results in the glazing having the coating material on the sunlight absorbing surfaces and the sunlight transmitting surfaces are without any covering or black material.

Figure 7:
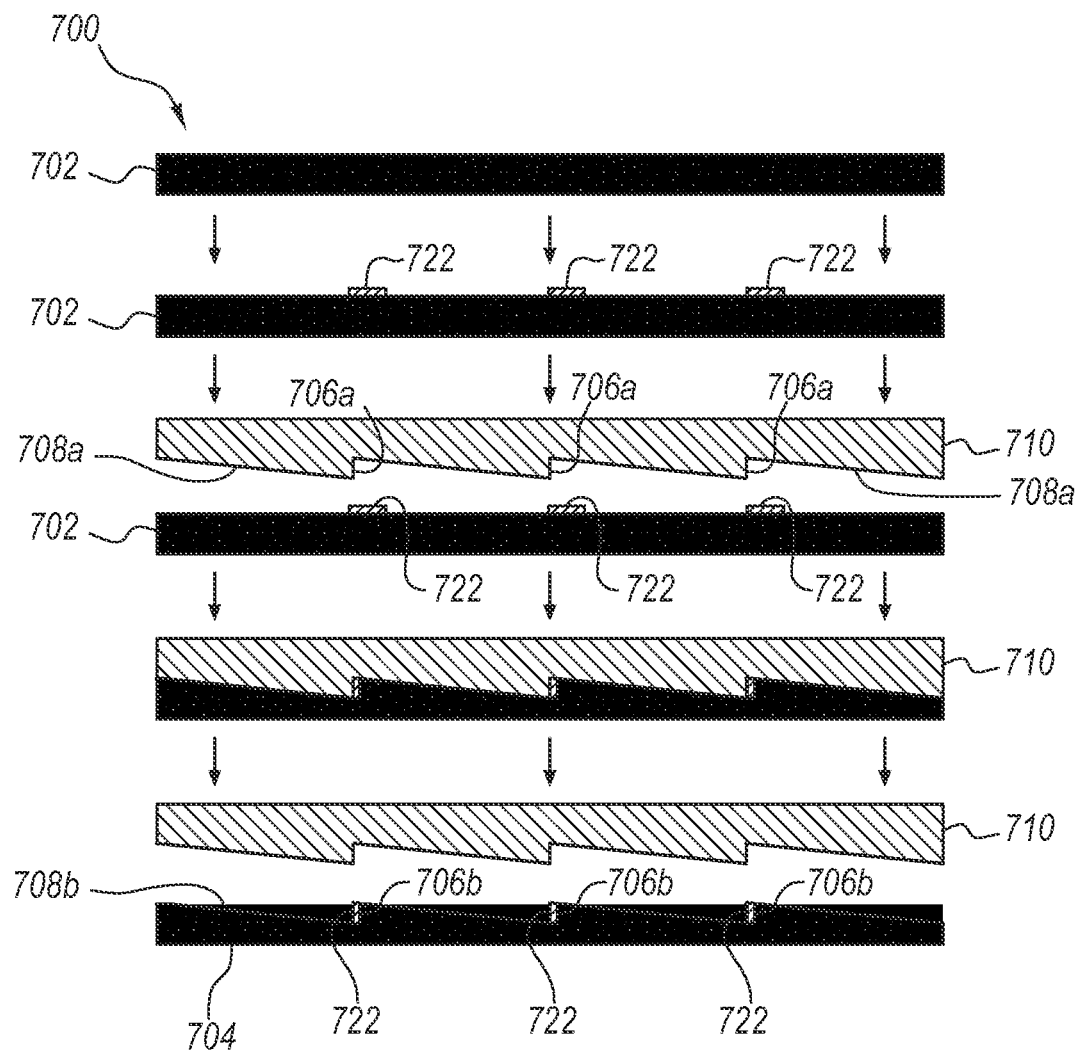
FIG. 7 shows a schematic representation of an embossing process for preparing a window glazing having selective sunlight absorbance and transmittance.

FIG. 7 shows a schematic representation of an embossing process for preparing a window glazing having selective sunlight absorbance and transmittance arranged in accordance with at least some embodiments described herein. More specifically, FIG. 7 illustrates an example of a method for manufacturing a glazing 700 as described herein. As shown, initially a glazing composition 702 is prepared. Next, a sunlight absorbing coating 722 material is applied as discrete locations on the glazing composition. Next, a mold 710 is provided and oriented with respect to the glazing composition 702. The mold 710 includes a complementary sunlight absorbing surface 706a that is the mirror image of a sunlight absorbing surface 706b to be formed on the glazing composition 702. The mold also includes a complementary sunlight transmitting surface 708a that is the mirror image of a sunlight transmitting surface 708b to be formed on the glazing composition 702. The alignment of the mold 710 and the glazing composition 702 can be sufficient so that the mold 710 can emboss the glazing composition 702 with the shape of the glazing. When embossing, the pressure applied can be determined based on the materials being used and the desired glazing end product. The pressure and embossing parameters vary depending on the compositions. Once the shape of the mold 710 has been imparted to the glazing composition 702, the glazing product 704 is obtained that has the sunlight absorbing surfaces 706b having the sunlight absorbing coatings 722 and the sunlight transmitting surfaces 708b are devoid of any sunlight absorbing coating.

An example of a process that forms a standalone glazing is as follows. First, mix Tetraalkoxysilane (e.g., tetraethoxysilane), Alcohol (e.g., Ethanol), water and Acid (e.g., Nitric acid) in suitable amounts under room temperature. Then, stir the mixture solution under 60° C. for 1 hour. Next, prepare a sol dispersion from partially hydrolized and partially condensed tetraalkoxysilane condensation product from the mixture. The sol dispersion should have some viscosity, and can be prepared through an evaporator condensing method which can avoid gelation. The sol dispersion is then applied onto a substrate (e.g., glass) that can either be integrated as part of the glazing or capable of being separated from the glazing once the glazing is hardened into a usable condition. The resulting glazing product can either include the substrate or it can be removed from the substrate prior to use. The sol dispersion is processed through a hydrolysis and condensation reaction into a gelatinous material that can receive a coating. Black ink is printed onto the gelatinous sol dispersion so that the black ink is at even intervals. The ink is then dried. The black ink is positioned to form the sunlight absorbing coatings on the glazing as described herein. A mold or embossing member is set onto the gelatinous sol dispersion in an appropriate alignment so that when the material is pressed with the mold or embossing member, the ink is positioned to form a coating on a sunlight absorbing surface. This can be seen in FIG. 7. The mold or embossing member can be aligned by matching with the ink. After the embossing process, the gelatinous sol dispersion can include the ridgeline as described herein having the ink on a surface that corresponds with a sunlight absorbing surface and the surface that corresponds with the sunlight transmitting surface can be devoid of the ink. The molded or embossed gelatinous sol dispersion can then be calcinated in a stove, for example, under 1100° C. for half day.

In view of the foregoing, a method of manufacturing a window glazing can be provided. Such a method can include: determining a geographical area for the window glazing; obtaining an eigenvalue α for noon during summer solstice for the geographical location; obtaining an eigenvalue β for noon during winter solstice for the geographical location; inputting the eigenvalues α and β into a computing system; computing, with the computing system, a design of one or more ridges for the window glazing, each of the one or more ridges including a light absorbing surface that protrudes away from a base to a tip formed with a light transmitting surface sloped from the tip toward the base; and manufacturing a window glazing in accordance with the design. Alternatively, a window glazing design can be provided, and the glazing can be manufactured in accordance with the design.

In one embodiment, the method of manufacture can include preparing a composition (e.g., a sol-gel composition having tetraalkoxysilane) to be used for preparing the window glazing from. The composition can be cast to have the designed surface geometry and then solidified. For example, the method of manufacture can include casting a sol-gel composition so as to have a surface geometry of the designed window glazing, and solidifying the sol-gel composition. The method of manufacture can also include heating and drying or calcinating the window composition (e.g., sol-gel composition) for solidification.

The method of manufacture can also include covering or coating the light absorbing surfaces with the light absorbing coating. In one example, the covering is by inkjet printing. In another example, the covering is by a photoresist technique.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the terminology used herein is for the purpose of describing particular embodiments only, and is not intended to be limiting.

In one embodiment, the present methods can include aspects performed on a computing system. As such, the computing system can include a memory device that has the computer-executable instructions for performing the method. The computer-executable instructions can be part of a computer program product that includes one or more algorithms for performing any of the methods of any of the claims.

In one embodiment, any of the operations, processes, methods, or steps described herein can be implemented as computer-readable instructions stored on a computer-readable medium. The computer-readable instructions can be executed by a processor of a wide range of computing systems from desktop computing systems, portable computing systems, tablet computing systems, hand-held computing systems and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 6:
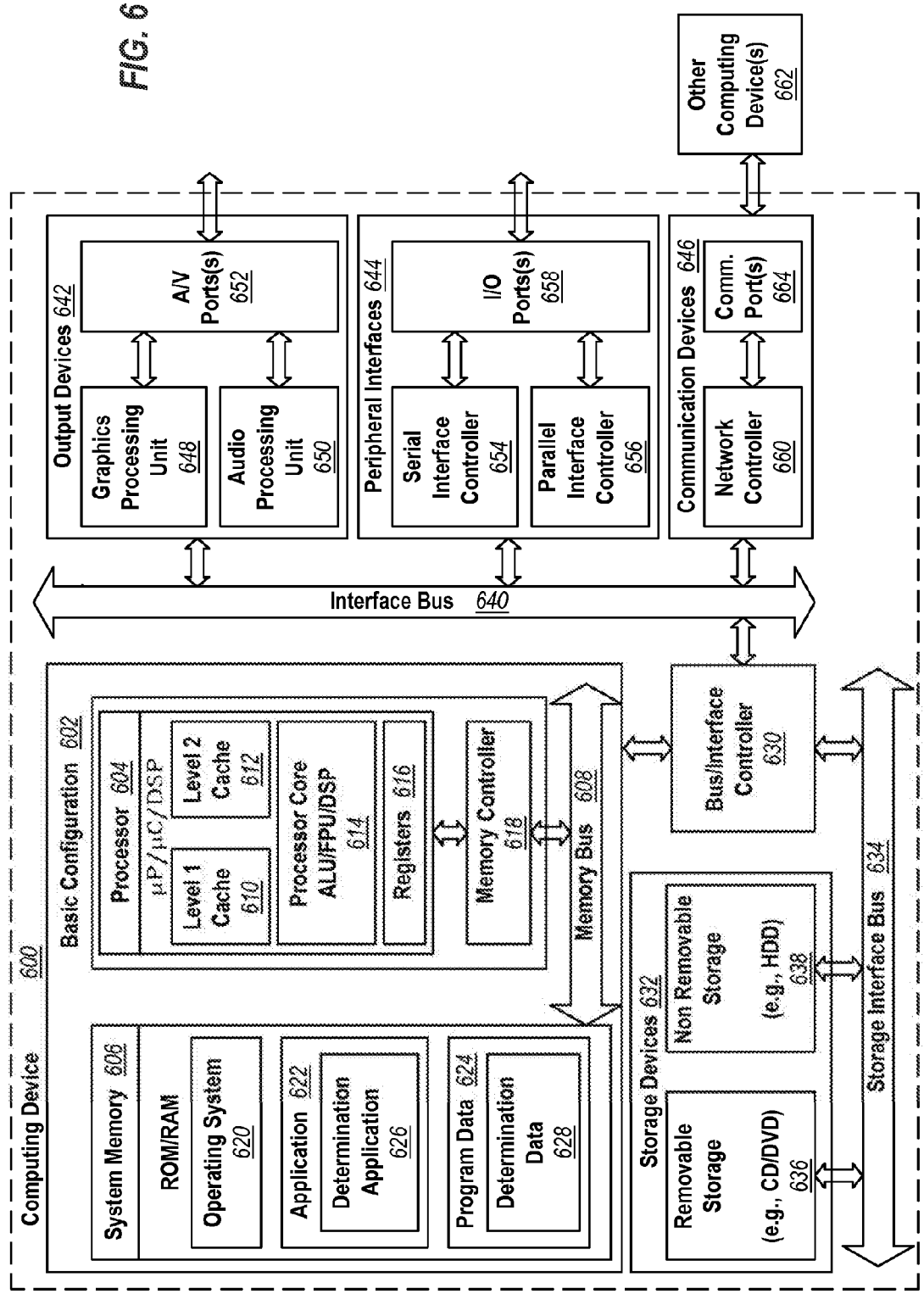
FIG. 6 shows a schematic representation of a computing device that can be used in various method steps described herein, such as method steps related to determinations or calculations of values of variables for a light absorbing, transparent window glazing.

FIG. 6 shows an example computing device 600 that is arranged to perform any of the computing methods described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a determination application 626 that is arranged to perform the functions as described herein including those described with respect to methods described herein. Program Data 624 may include determination information 628 that may be useful for analyzing the contamination characteristics provided by the sensor unit 240. In some embodiments, application 622 may be arranged to operate with program data 624 on operating system 620 such that the work performed by untrusted computing nodes can be verified as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method of designing a light absorbing, substantially non-reflecting transparent window glazing, the method comprising:
   determining a geographical area for the window glazing that has a base surface and one or more light absorbing surface and light transmitting surface pairs that together form a ridge, the light absorbing surface being about 90 degrees with respect to the base and forming a top surface of each ridge;
   obtaining an eigenvalue $\alpha$ for noon during summer solstice for the geographical location;
   obtaining an eigenvalue $\beta$ for noon during winter solstice for the geographical location;
   determining a substantially non-reflective light absorbing coating to be applied to each light absorbing surface;
   inputting the eigenvalues $\alpha$ and $\beta$ into a computing system that has equations for calculating the window glazing to have substantially zero (0) or minimum light transmission when the window glazing is vertical and facing between east to south to west at noon of summer solstice for the geographical location when north of the equator or facing between east to north to west at noon of summer solstice for the geographical location when south of the equator and/or the window glazing to have substantially 100% or maximum light transmission when the window glazing is vertical and facing between east to south to west at noon of winter solstice for the geographical location when north of the equator or facing between east to north to west at noon of winter solstice for the geographical location when south of the equator; and
   computing, with the computing system, a design of the one or more ridges for the window glazing with the equations based on the eigenvalues $\alpha$ and $\beta$ and zero reflectivity of light absorbing surfaces and light transmitting surfaces, each of the one or more ridges including a light absorbing surface that protrudes away from a base to a tip formed with a light transmitting surface sloped downward from the tip toward the base, each light absorbing surface having the substantially non-reflective light absorbing coating so as to form an outermost surface on each of the one or more light absorbing surfaces, the light absorbing coating being substantially non-reflective that reflects less than 10% of sunlight.

2. The method of claim 1, comprising calculating values of parameters of the ridge with Equation 1 and Equation 2:

$$T = T_0 - a/b \tan \Theta_\phi \qquad \text{Equation 1}$$

$$\Theta_\phi = \tan^{-1}(\tan \Theta / \sin \phi) \qquad \text{Equation 2}$$

wherein,
T is transmittance;
$T_0$ is strength of sunlight on Vernal Equinox and Autumnal Equinox;
$\Theta$ is an angle between sunlight and ground;
$\phi$ is an angle between directly east and sunlight, and if sunlight is directly east $\phi$ is zero (0);
a is height of the light absorbing surface relative to the base surface;
b is the length of the base under a light absorbing surface and light transmitting surface pair; and
$0 \leq \Theta \leq \pi/4$ and $0 \leq \phi \leq 2\pi$.

3. The method of claim 1, comprising calculating values of parameters of the ridge with Equation 1, and Equation 3:

$$T = T_0 - a/b \tan \Theta_\phi \qquad \text{Equation 1}$$

$$\Theta_\phi = \tan^{-1}(\tan \Theta / \sin(\phi+\omega)) \qquad \text{Equation 3}$$

wherein,
T is transmittance;
$T_0$ is strength of sunlight on Vernal Equinox and Autumnal Equinox;
$\Theta$ is an angle between sunlight and ground;
$\phi$ is an angle between directly east and sunlight, and if sunlight is directly east $\phi$ is zero (0);
$\omega$ is an angle between due east and the base surface;
a is height of the light absorbing surface relative to the base surface;
b is the length of the base under a light absorbing surface and light transmitting surface pair; and
$0 \leq \Theta \leq \pi/4$ and $0 \leq \phi \leq 2\pi$,
wherein if $2\pi > \phi + \omega > \pi$, then T is zero (0).

4. The method of claim 3, wherein if the base surface is normal to due east, then $\omega = \pi/2$ and Equation 4 is used in place of Equation 3

$$\Theta_{100} = \tan^{-1}(\tan \Theta / \sin(\phi+\pi/2)) \qquad \text{Equation 4.}$$

5. The method of claim 1, comprising calculating values of parameters of the ridge with Equation 1, and Equation 5:

$$T = T_0 - a/b \tan \Theta_\phi \qquad \text{Equation 1}$$

$$\Theta_\phi = \tan^{-1}(\tan \Theta / \sin(\phi+3\pi/2)) \qquad \text{Equation 5}$$

wherein,
T is transmittance;
$T_0$ is strength of sunlight on Vernal Equinox and Autumnal Equinox;
$\Theta$ is an angle between sunlight and ground;

φ is an angle between directly east and sunlight, and if sunlight is directly east φ is zero (0);

ω is 3π/2;

a is height of the light absorbing surface relative to the base surface;

b is the length of the base under a light absorbing surface and light transmitting surface pair; and 0≤Θ≤π/4 and 0≤φ≤2π, wherein if 2π>φ+ω>π, then T is zero (0).

6. The method of claim 1, comprising calculating values of parameters of the ridge with Equation 1, and Equation 7:

$$T = T_0 - a/b \tan \Theta_\phi \qquad \text{Equation 1}$$

$$\Theta_\phi = \tan^{-1}(\tan(\Theta-\delta)/\sin(\phi+\omega)) \qquad \text{Equation 7}$$

wherein,

T is transmittance;

$T_0$ is strength of sunlight on Vernal Equinox and Autumnal Equinox;

Θ is an angle between sunlight and ground;

φ is an angle between directly east and sunlight, and if sunlight is directly east φ is zero (0);

ω is an angle between due east and the base surface;

δ is an angle between the base surface and vertical;

a is height of the light absorbing surface relative to the base surface;

b is the length of the base under a light absorbing surface and light transmitting surface pair; and 0≤Θ≤π/4 and 0≤φ≤2π.

7. A method of manufacturing a transparent window glazing, the method comprising:

obtaining the design of the light absorbing, substantially non-reflecting transparent window glazing of claim 1, the design including:

dimensions of the one or more light absorbing surfaces; and dimensions of the one or more light transmitting surfaces; and manufacturing the transparent window glazing.

8. The method of claim 7, comprising determining a geographical location for the window to be utilized and designing the window glazing for the geographical location.

9. The method of claim 7, comprising:

preparing a sol-gel composition having tetraalkoxysilane;

casting the sol-gel composition so as to have a surface geometry of the designed window glazing;

providing the geometry of the window glazing to a window glazing composition; and solidifying the sol-gel composition.

10. The method of claim 9, comprising:

providing the geometry of the window glazing to a window glazing composition; and comprising heating and calcinating a window glazing composition.

11. A transparent window glazing comprising:

a transparent glazing body comprising:

a substantially flat base surface;

one or more light absorbing surfaces opposite of the base surface and having a relative angle with the base surface of about 90 degrees; and one or more light transmitting surfaces opposite of the base surface and alternating with the one or more light absorbing surfaces so that each light transmitting surface is located adjacent to one or more light absorbing surfaces and so that each light absorbing surface and light transmitting surface pair forms a ridge protruding from the base surface, wherein each light absorbing surface is a top surface of each ridge; and a substantially non-reflective light absorbing coating covering each of the one or more light absorbing surfaces so as to form an outermost surface on each of the one or more light absorbing surfaces, the light absorbing coating being substantially non-reflective that reflects less than 10% of sunlight, wherein the one or more light absorbing surfaces and one or more light transmitting surfaces are configured to have a minimum light transmission when located on a vertical window facing between east to south to west at noon of summer solstice at a geographical location and directional orientation at or north of the equator or facing between east to north to west at noon of summer solstice at a geographical location and directional orientation at or south of the equator.

12. The window glazing of claim 11, wherein the glazing is configured to have substantially 100% or maximum light transmission when located on a vertical window facing between east to south to west at noon of winter solstice at a geographical location and directional orientation at or north of the equator or facing between east to north to west at noon of winter solstice at a geographical location and directional orientation at or south of the equator.

13. The window glazing of claim 12, wherein the light transmission is calculated by Equation 1 and Equation 2:

$$T = T_0 - a/b \tan \Theta_\phi \qquad \text{Equation 1}$$

$$\Theta_{100} = \tan^{-1}(\tan \Theta/\sin \phi) \qquad \text{Equation 2}$$

wherein,

T is transmittance;

$T_0$ is strength of sunlight on Vernal Equinox and Autumnal Equinox;

Θ is an angle between sunlight and ground;

φ is an angle between directly east and sunlight, and if sunlight is directly east φ is zero (0);

a is height of the light absorbing surface relative to the base surface;

b is the length of the base under a light absorbing surface and light transmitting surface pair; and 0≤Θ≤π/4 and 0≤φ≤2π, wherein between the Vernal Equinox and the Autumnal Equinox: 2π>φ>π, if φ is within this range, T is 0.

14. The window glazing of claim 12, wherein the light transmission is calculated by Equation 1, and Equation 3:

$$T = T_0 - a/b \tan \Theta_\phi \qquad \text{Equation 1}$$

$$\Theta_\phi = \tan^{-1}(\tan \Theta/\sin(\phi+\omega)) \qquad \text{Equation 3}$$

wherein,

T is transmittance;

$T_0$ is strength of sunlight on Vernal Equinox and Autumnal Equinox;

Θ is an angle between sunlight and ground;

φ is an angle between directly east and sunlight, and if sunlight is directly east φ is zero (0);

ω is an angle between due east and the base surface;

a is height of the light absorbing surface relative to the base surface;

b is the length of the base under a light absorbing surface and light transmitting surface pair; and 0≤Θ≤π/4 and 0≤φ≤2π, wherein if 2π>φ+ω>π, then T is zero (0).

15. The window glazing of claim 14, wherein if the base surface faces due east, then ω=π/2 and Equation 4 is used in place of Equation 3

$$\Theta_\phi = \tan^{-1}(\tan \Theta/\sin(\phi+\pi/2)) \qquad \text{Equation 4.}$$

16. The window glazing of claim 12, wherein the light transmission is calculated by Equation 1, and Equation 5:

$$T = T_0 - a/b \tan \Theta_\phi \quad \text{Equation 1}$$

$$\Theta_\phi = \tan^{-1}(\tan \Theta / \sin(\phi + 3\pi/2)) \quad \text{Equation 5}$$

wherein,

T is transmittance;

$T_0$ is strength of sunlight on Vernal Equinox and Autumnal Equinox;

$\Theta$ is an angle between sunlight and ground;

$\phi$ is an angle between directly east and sunlight, and if sunlight is directly east $\phi$ is zero (0);

$\omega$ is $3\pi/2$;

a is height of the light absorbing surface relative to the base surface;

b is the length of the base under a light absorbing surface and light transmitting surface pair; and $0 \leq \Theta \leq \pi/4$ and $0 \leq \phi \leq 2\pi$, wherein if $2\pi > \phi + \omega > \pi$, then T is zero (0).

17. The window glazing of claim 12, wherein the light transmission is calculated by Equation 1, and Equation 7:

$$T = T_0 - a/b \tan \Theta_T \quad \text{Equation 1}$$

$$\Theta_\phi = \tan^{-1}(\tan(\Theta - \delta)/\sin(\phi + \omega)) \quad \text{Equation 7}$$

wherein,

T is transmittance;

$T_0$ is strength of sunlight on Vernal Equinox and Autumnal Equinox;

$\Theta$ is an angle between sunlight and ground;

$\phi$ is an angle between directly east and sunlight, and if sunlight is directly east $\phi$ is zero (0);

$\omega$ is an angle between due east and the base surface;

$\delta$ is an angle between the base surface and vertical;

a is height of the light absorbing surface relative to the base surface;

b is the length of the base under a light absorbing surface and light transmitting surface pair; and $0 \leq \Theta \leq \pi/4$ and $0 \leq \phi \leq 2\pi$.

18. A window comprising:

a window; and the transparent window glazing of claim 11 attached to the window.

* * * * *